(12) United States Patent
Kataoka et al.

(10) Patent No.: US 7,294,796 B2
(45) Date of Patent: Nov. 13, 2007

(54) SWITCH DEVICE, DATA-PROCESSING APPARATUS AND PLAYBACK APPARATUS

(75) Inventors: Yoshinori Kataoka, Tokorozawa (JP); Keitaro Kaburagi, Tokorozawa (JP); Tetsuya Kikuchi, Tokorozawa (JP); Hiroshi Kawami, Tokorozawa (JP)

(73) Assignee: Pioneer Corporation, Tokyo (JP)

( * ) Notice: Subject to any disclaimer, the term of this patent is extended or adjusted under 35 U.S.C. 154(b) by 721 days.

(21) Appl. No.: 10/645,853

(22) Filed: Aug. 22, 2003

(65) Prior Publication Data
US 2004/0079623 A1 Apr. 29, 2004

(30) Foreign Application Priority Data
Aug. 23, 2002 (JP) .............. 2002-243940

(51) Int. Cl.
*H01H 19/00* (2006.01)
(52) U.S. Cl. .............. 200/11 R; 200/501; 200/336
(58) Field of Classification Search . 200/11 R–11 TW, 200/61.39, 61.46, 501, 500, 564, 573, 574, 200/336, 61.45
See application file for complete search history.

(56) References Cited

U.S. PATENT DOCUMENTS

| | | | | |
|---|---|---|---|---|
| 3,021,402 A | * | 2/1962 | La Warre et al. | 200/61.46 |
| 3,247,340 A | * | 4/1966 | Kitzmann | 200/61.46 |
| 3,651,290 A | * | 3/1972 | Durbin et al. | 200/61.45 R |
| 4,406,934 A | * | 9/1983 | Elszasz | 200/61.39 |
| 4,725,699 A | * | 2/1988 | Houdeshell | 200/80 A |
| 4,771,142 A | * | 9/1988 | Spinner | 200/501 |
| 6,494,541 B1 | * | 12/2002 | Fujii | 297/474 |
| 6,948,856 B2 | * | 9/2005 | Takizawa et al. | 384/448 |
| 7,087,849 B2 | * | 8/2006 | Brown et al. | 200/61.39 |
| 7,166,810 B2 | * | 1/2007 | Hanahara et al. | 200/11 R |

FOREIGN PATENT DOCUMENTS

| EP | 0 973 162 A | 1/2000 |
|---|---|---|
| JP | 10-199126 | 7/1998 |
| JP | 2001-188539 | 7/2001 |

* cited by examiner

*Primary Examiner*—Michael A Friedhofer
(74) *Attorney, Agent, or Firm*—Kratz, Quintos & Hansen, LLP

(57) ABSTRACT

A playback apparatus is provided, which comprises a switch device (200) that gives the user good feeling of operating. A tape-shaped switch (500) is provided on a base part (410), extending along the circumference of the base part (410). A ring-shaped rotational drive section (450) opposes the tape-shaped switch (500) and can move to and from the base part (410). A plurality of second rollers (440), each having a roller part (444) made of rubber or the like, are rotatably mounted on the rotational drive section (450). A flange (313) continuously extending outward from the disc-shaped table plate (311) of a jog table unit (310) is mounted on the rotational drive section (450). When the user rotates the jog table unit (310), the rotation-detecting section (470) provided on the base part (410) detects the rotation of the unit (310). The flange (313) is supported by the second rollers (440) at a position outside a position where the user touches the jog table unit (310) and rotates, so that the rotation of the jog table unit (310) can be reliably detected. The user can obtain good feeling of operating the switch device (200).

17 Claims, 15 Drawing Sheets

SWITCH DEVICE, DATA-PROCESSING APPARATUS AND PLAYBACK APPARATUS

BACKGROUND OF THE INVENTION

1. Field of the Invention

The present invention relates to a switch device, a data-processing apparatus, and a playback apparatus.

2. Description of Related Art

Conventionally, various types of configurations such as a button-type switch and a volume-type switch are known as switch devices to control electric signal. Switch devices of each type are selected to use for various electric apparatuses in accordance with what kind of an electric signal controls it, how it is controlled by the signal and what outer appearance it has.

A DJ playing is known, in which a performer called "disc jockey (DJ)" operates a record player as a playback apparatus to play dance music or the like. The DJ playing is a method of effectively playing back the music data recorded on a record, such as dance music. More specifically, the disc jockey manually controls the rotation of the turntable of the record player to play back the music data recorded on the record placed on the turntable, and stop the playing back of the music, repeatedly plays back the same phrase, and rewind to the point for playing back.

In recent years, the playback apparatuses have been developed, each of which can play back dance music or the like from recording media such as a CD (Compact Disc) and a DVD (Digital Versatile Disc) on which the music data is recorded in the form of digital data. The playback apparatus has various switch devices so that the disc jockey may operate the switch devices to control the rotation of a CD or a DVD, feeling as if manually controlling the rotation of the turntable of an analog record player.

Recently, the DJ playing has been much diversified. There is a demand for a CD or DVD playback apparatus that the disc jockeys can operate, feeling more vividly as manually controls the rotation of the turntable of an analog record player.

SUMMARY OF THE INVENTION

An object of the present invention is to provide a switch device, a data-processing apparatus and a playback apparatus, each of which can give the user good feeling of operating it.

A switch device according to the present invention comprises: a base section; a plurality of rollers which are arranged on the base section, extending in one plane in a radial direction of the base section; an operation unit which is rotatably mounted on the base section, with a circumferential edge supported on the rollers; and a rotation-detecting section which is provided on the base section and detects the rotation of the operation unit.

A data-processing apparatus according to the present invention comprises: a data-reading section which reads data from a recording medium; a data-processing section which processes the data read from the recording medium; a switch device according to the present invention; and a process control section which changes modes in which the data-processing section processes the data, when the rotation-detecting section of the switch device detects that the operation unit is rotating.

Another data-processing apparatus according to the present invention comprises: a data-reading section which reads data from a recording medium; a data-processing section which processes the data read from the recording medium; a switch device according to the present invention; and a process control section which changes modes in which the data-processing section processes the data, when the motion-detecting section of the switch device detects that the rotational drive section is moving.

A playback apparatus according to the present invention comprises: a data-processing apparatus according to the present invention; and a playback section which reproduces data processed by the data-processing apparatus.

DETAILED DESCRIPTION OF PREFERRED EMBODIMENT(S)

An embodiment of the present invention will be described, with reference to the accompanying drawings.

[Arrangement of Playback Apparatus]

Figure 1:
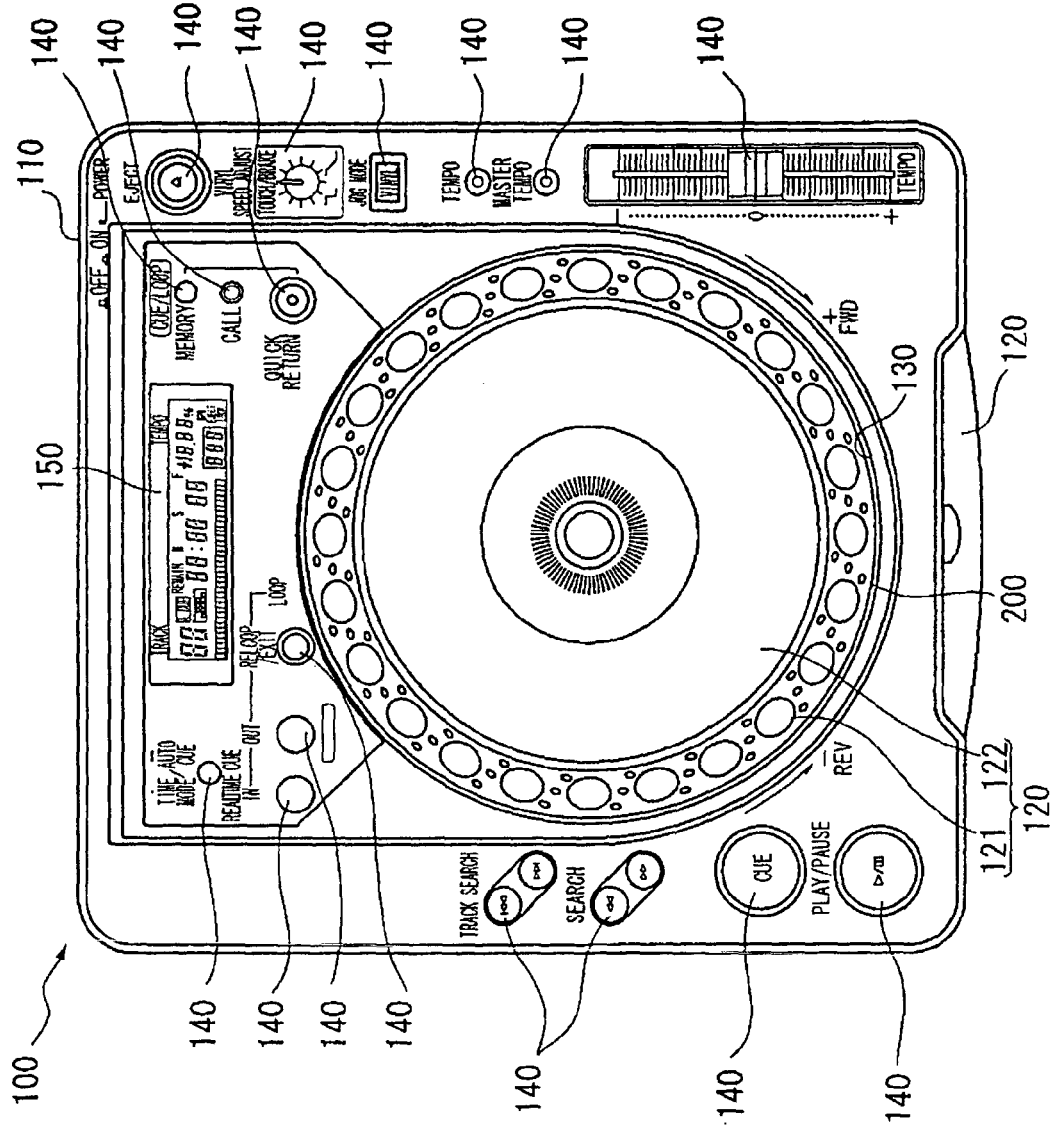
FIG. 1 is a plan view of a playback apparatus according to an embodiment of the present invention.

A playback apparatus according to an embodiment of the present invention will be described with reference to FIG. 1. FIG. 1 is a plan view of the playback apparatus according to the present invention.

In FIG. 1, numeral 100 designates the playback apparatus, which is a data-reproducing apparatus. The playback apparatus 100 plays back the data recorded on a recording medium (not shown). The apparatus 100 processes the data in the same way as a performer called "disc jockey," for example, operates a record player to play back the music data recorded on a record with a record player. Examples of the recording medium are an optical disk, a magnetic disk, a memory card, an IC (Integrated Circuit) card, or the like. The optical disk may be a CD-DA (Compact Disk-Digital Audio), a CD-ROM (Compact Disk-Read Only Memory), a DVD-ROM (Digital Versatile Disc-Read Only Memory), a DVD-R (Digital Versatile Disc-Recordable), or a DVD-RW (Digital Versatile Disc-ReWritable). The magnetic disk may be an MO (Magneto-optical) disk, a hard disk, or the like.

The playback apparatus 100 has a main case 110 that is approximately rectangular-shaped and made of, for example, ABS (Acrylonitiile-Butadiene-Styrene) resin. The main case 110 contains a data-processor (not shown) that comprises a process control section, a data-processing section, and a data-reading section.

The main case 110 has a slot 120 in one side (i.e., the lower side in FIG. 1). The recording medium can be inserted through the slot 120 into the data-processor contained in the main case 110. The main case 110 has a window 130 in the top (the surface shown in FIG. 1). The window 130 is almost circular. It is made in the substantially center part of the top of the main case 110, exposing a switch device 200 that constitutes, along with the data-processor, a data-processing apparatus according to the present invention. A plurality of switches 140 are arranged on the top of the main case 110. The switches 140 can be operated to input operating modes of the data-processor. Further, a display 150 is provided on the top of the main case 110. The display 150 is configured to display the operating modes set by operating the switches 140.

[Arrangement of Switch Device]

Figure 2:
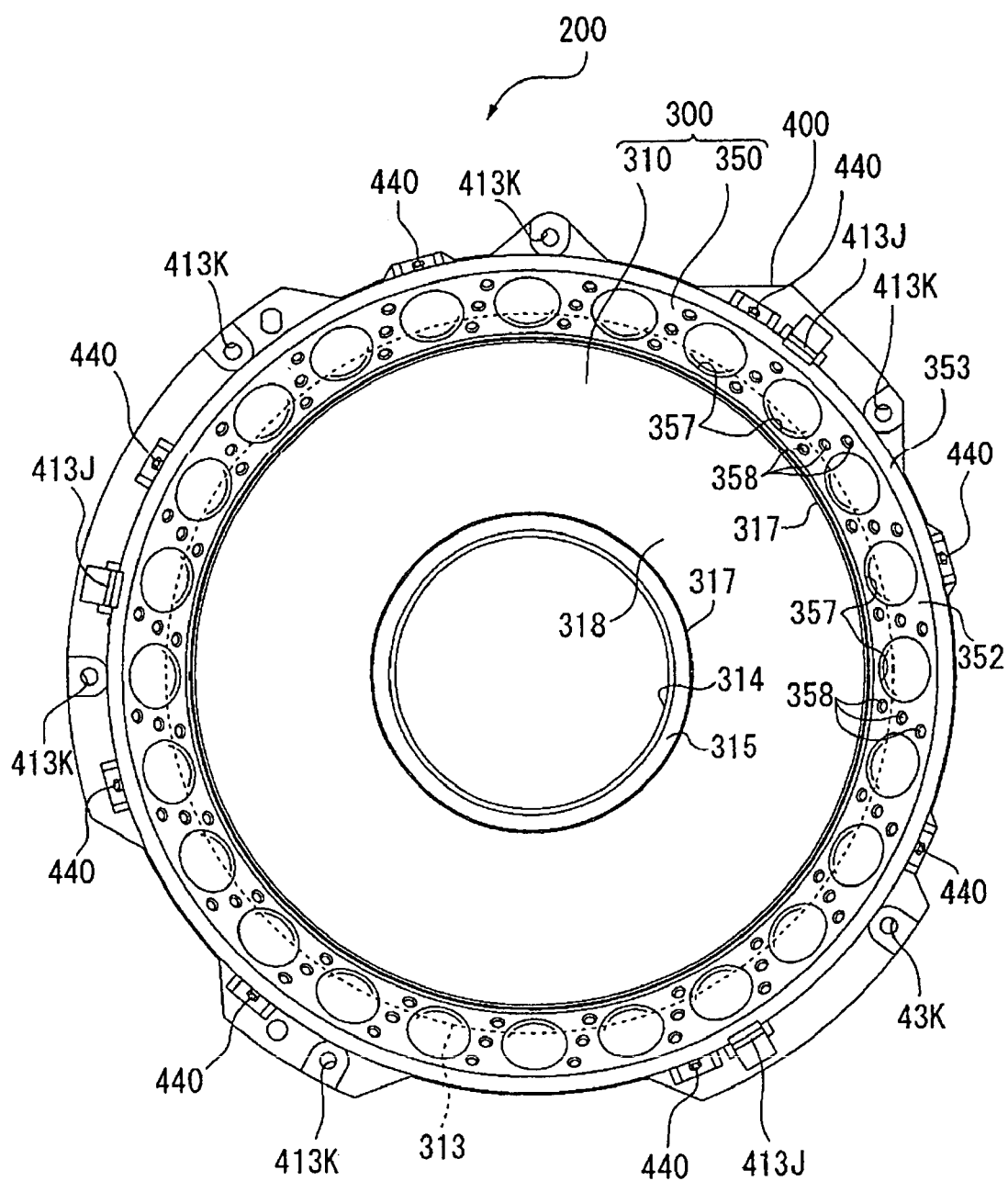
FIG. 2 is a plan view of a switch device according to the embodiment.
Figure 3:
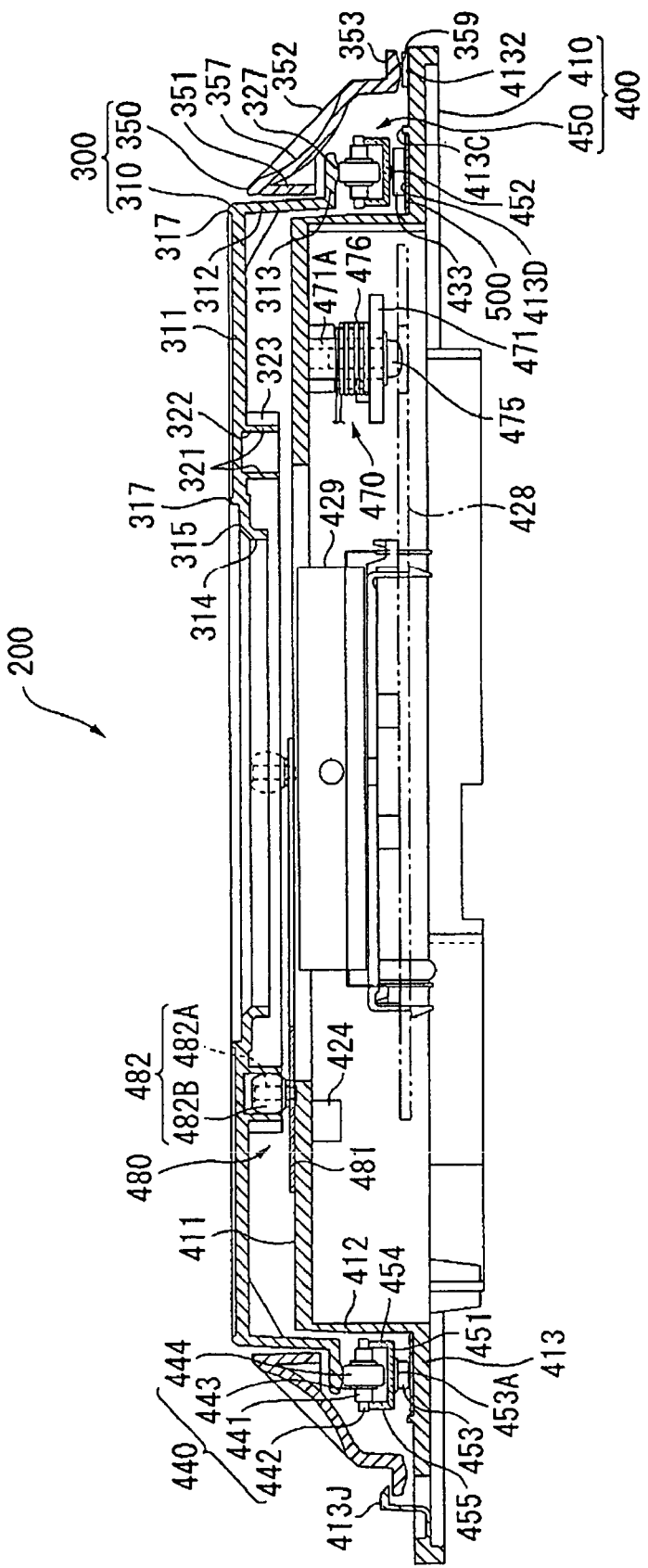
FIG. 3 is a cross-sectional view of the switch device according to the embodiment.
Figure 4:
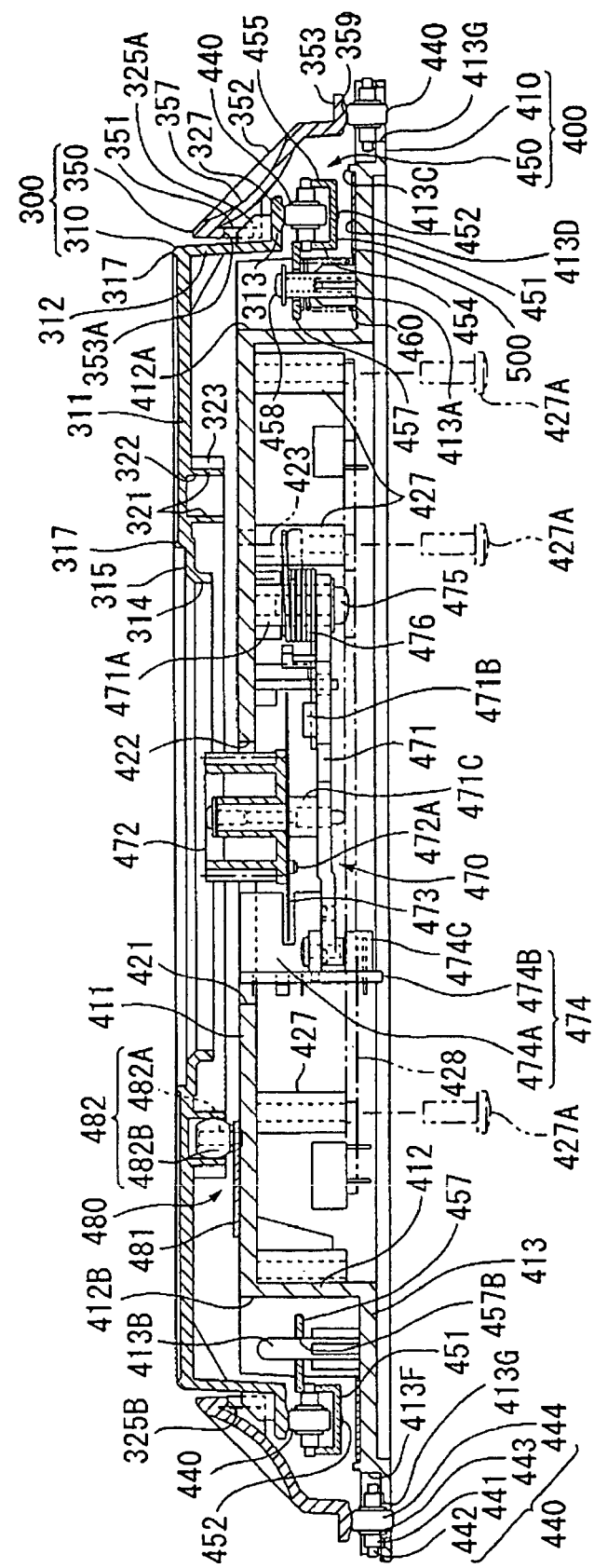
FIG. 4 is a cross-sectional view of the switch device, cut away at a rotation-detecting section according to the embodiment.
Figure 5:
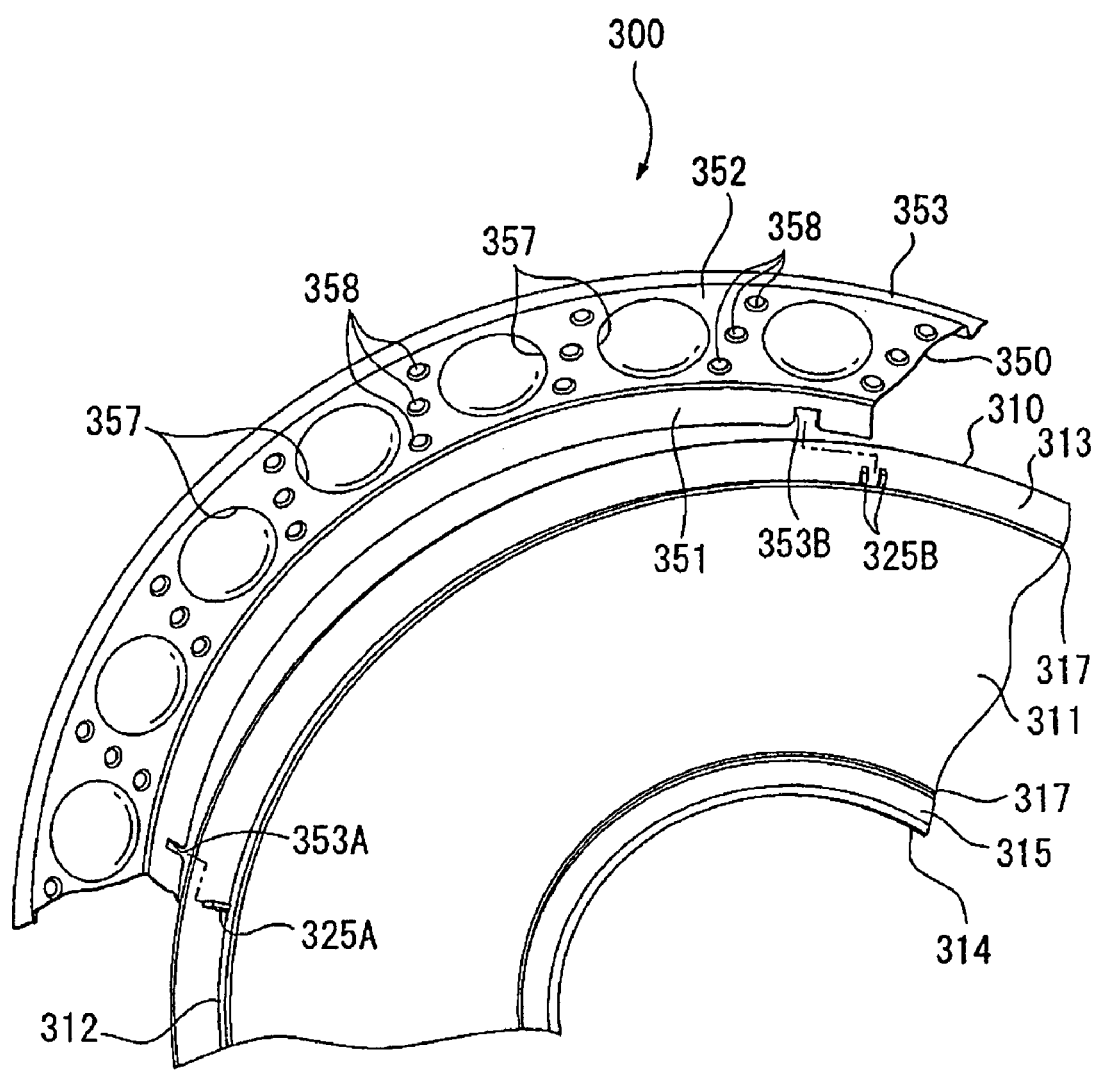
FIG. 5 is an exploded perspective view of a part of the switch device, cut away at a rotary section according to the embodiment.
Figure 6:
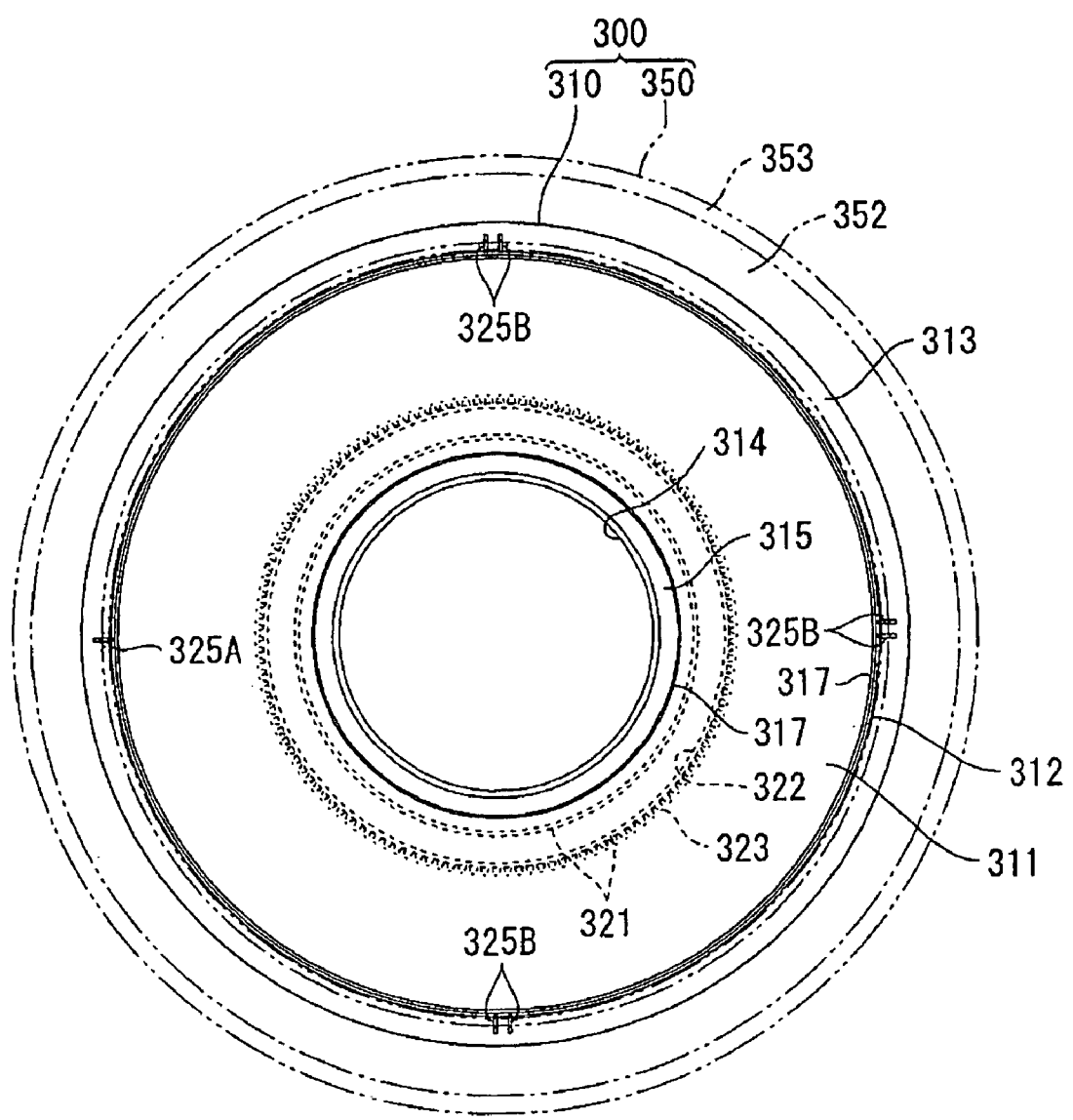
FIG. 6 is a plan view of the a jog table unit according to the embodiment.
Figure 7:
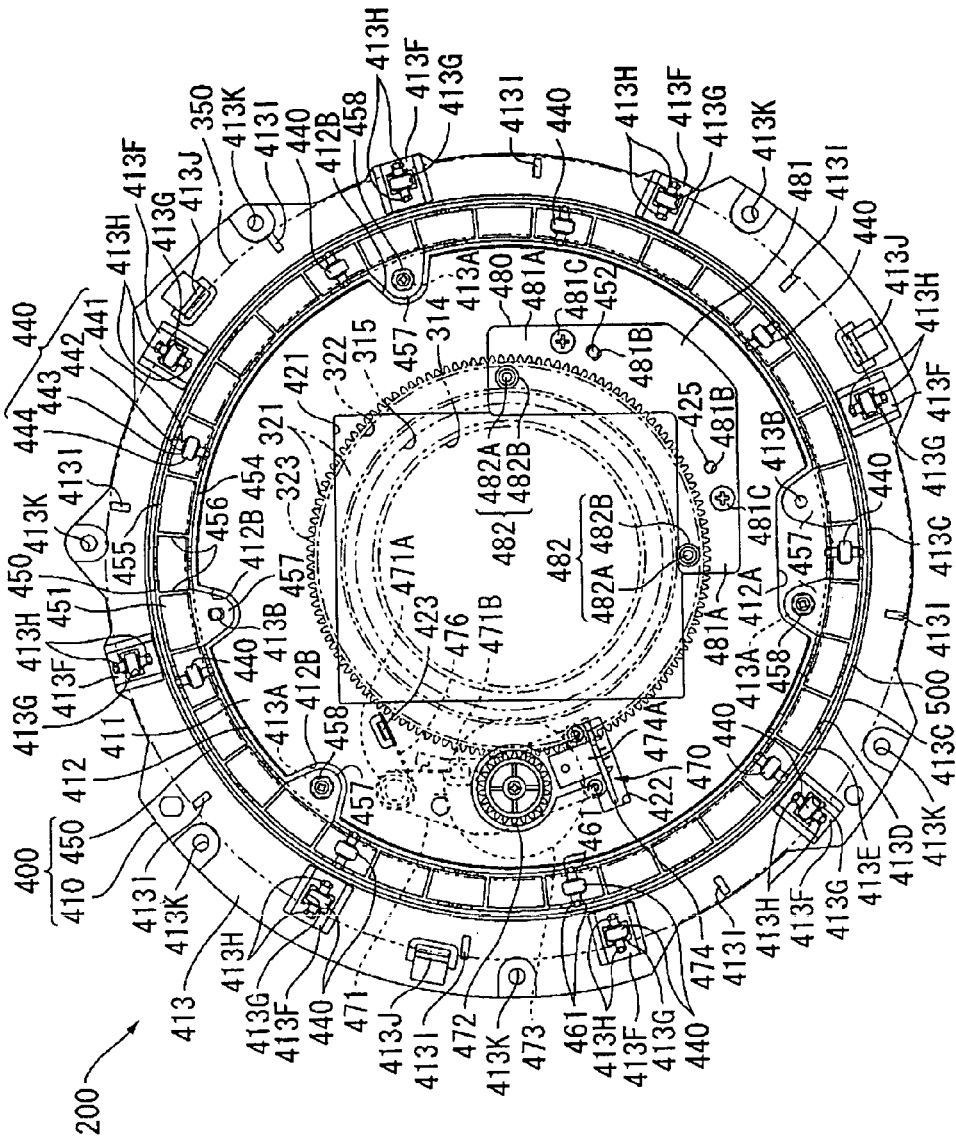
FIG. 7 is a plan view of the switch device according to the embodiment, with the rotary section removed, illustrating the relation between a rotary section and the rotation-detecting section.
Figure 8:
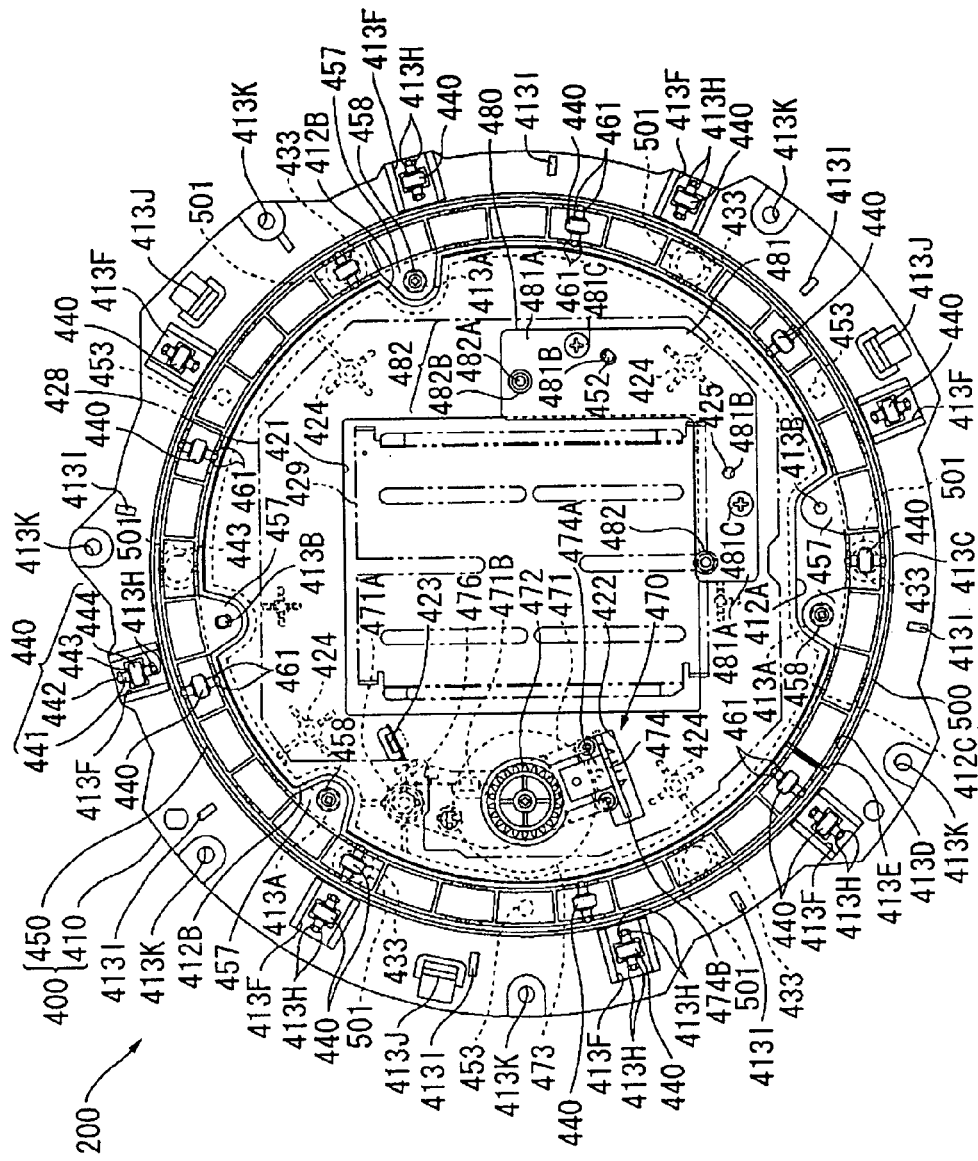
FIG. 8 is a plan view of the switch device according to the embodiment, with the rotary section removed, illustrating the position of the circuit board incorporated in the switch device.
Figure 9:
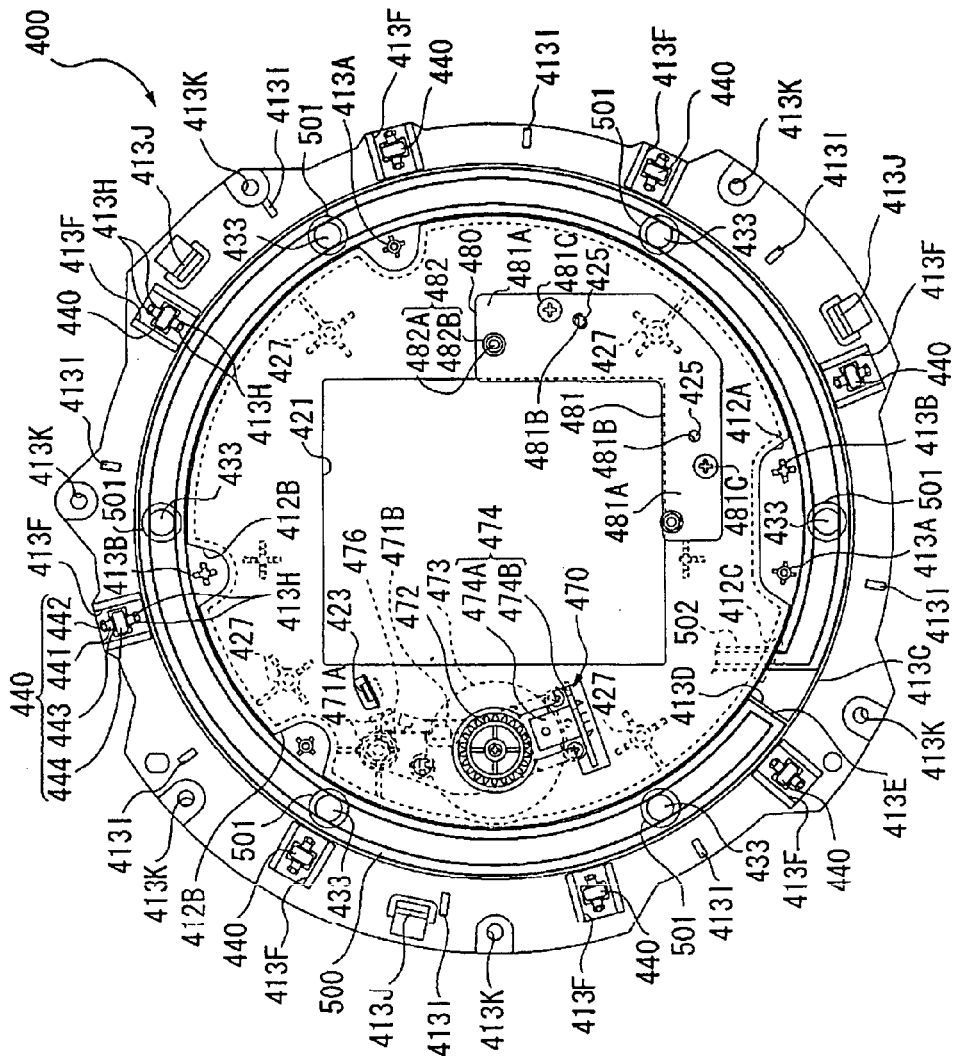
FIG. 9 is a plan view of the switch device according to the embodiment, with the rotary section and the rotational drive section removed.
Figure 10:
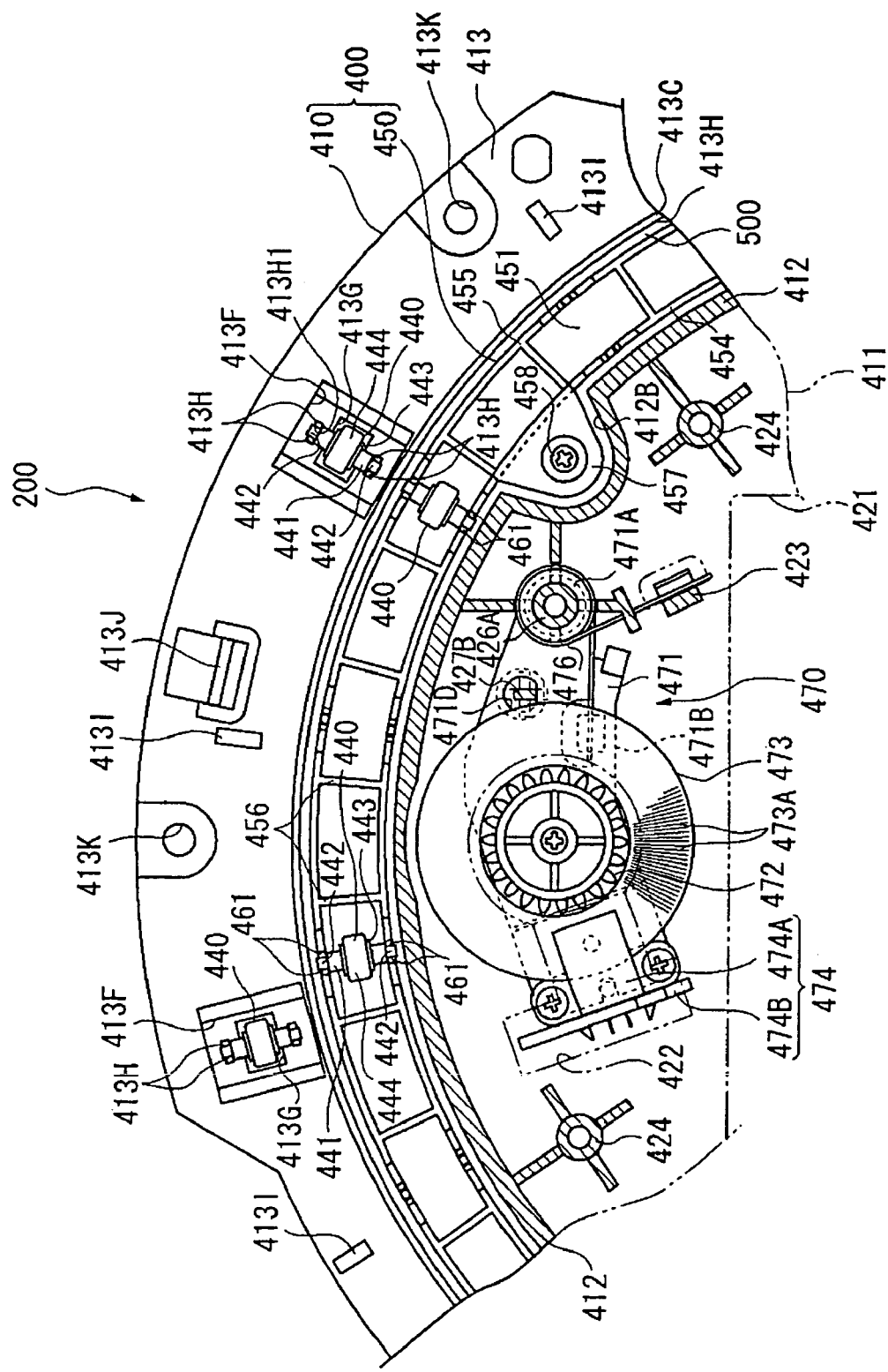
FIG. 10 is a plan view showing a part of the switch device according to the embodiment, with the rotor member removed, illustrating the rotation-detecting section and some components arranged near the rotation-detecting section.
Figure 11:
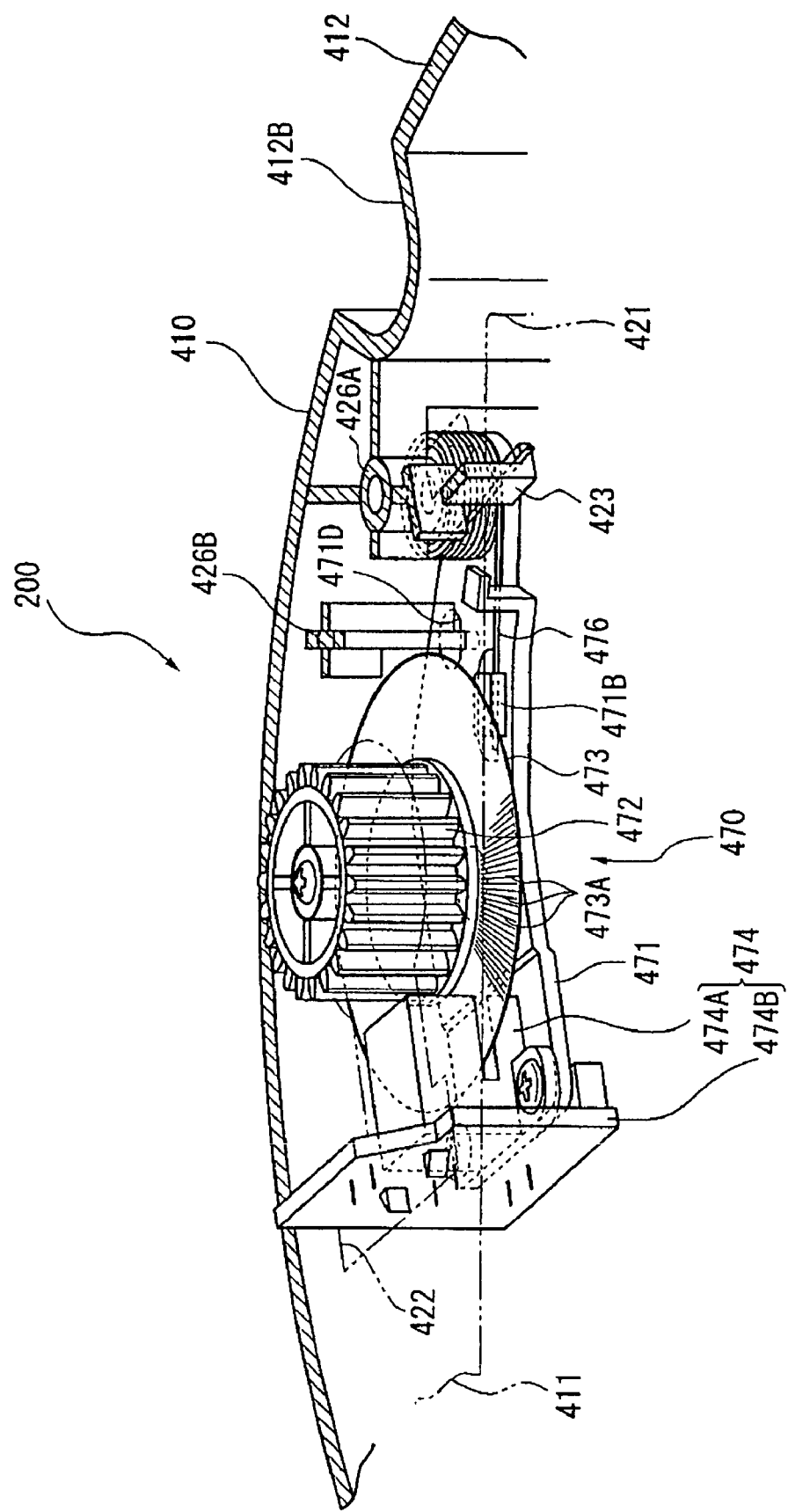
FIG. 11 is a perspective view of a part of the switch device according to the embodiment, with the rotor member removed and with a part of the base cut away.
Figure 12:
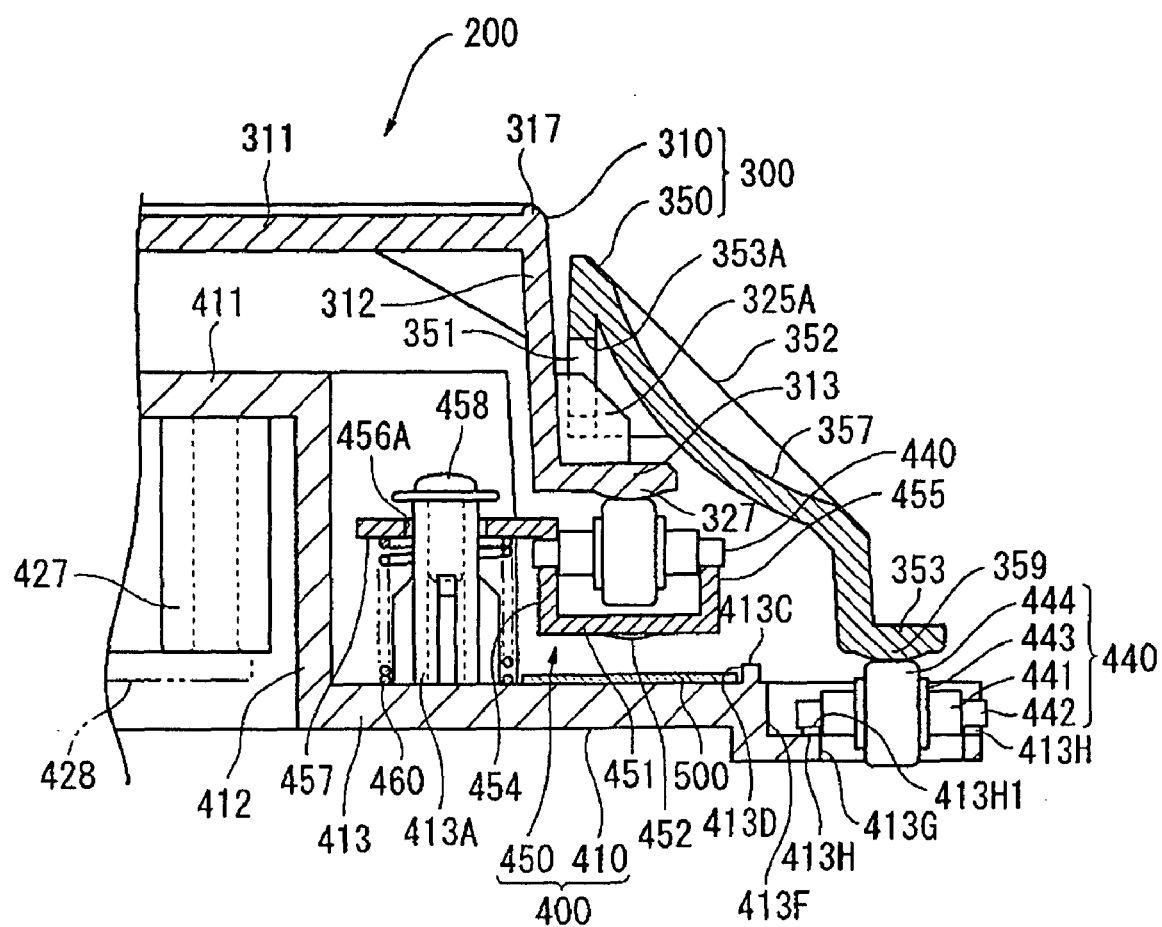
FIG. 12 is a fragmentary sectional view showing the screw-holding rib incorporated in, the switch device according to the embodiment and also depicting some components arranged near the screw-holding rib.
Figure 13:
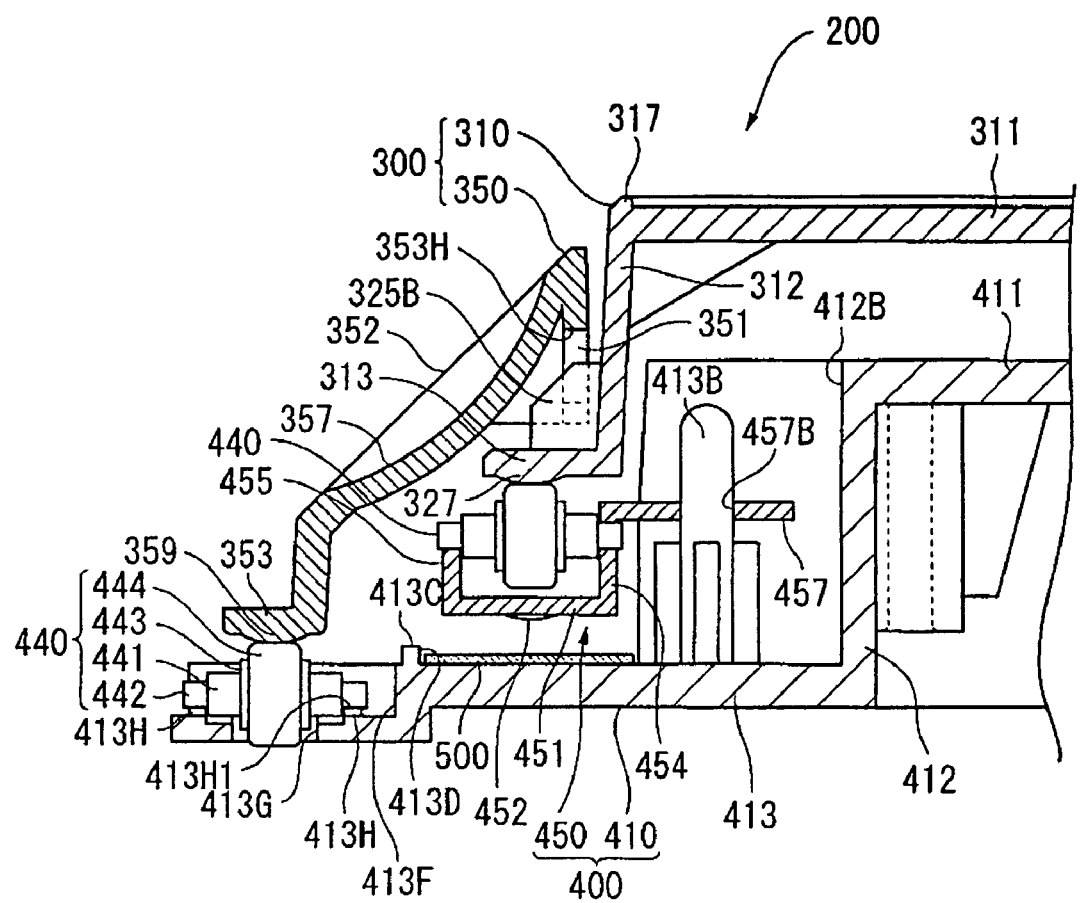
FIG. 13 is a fragmentary sectional view showing a guide-pin section used in the switch device according to the embodiment and showing some components arranged near the guide-pin section.
Figure 14:
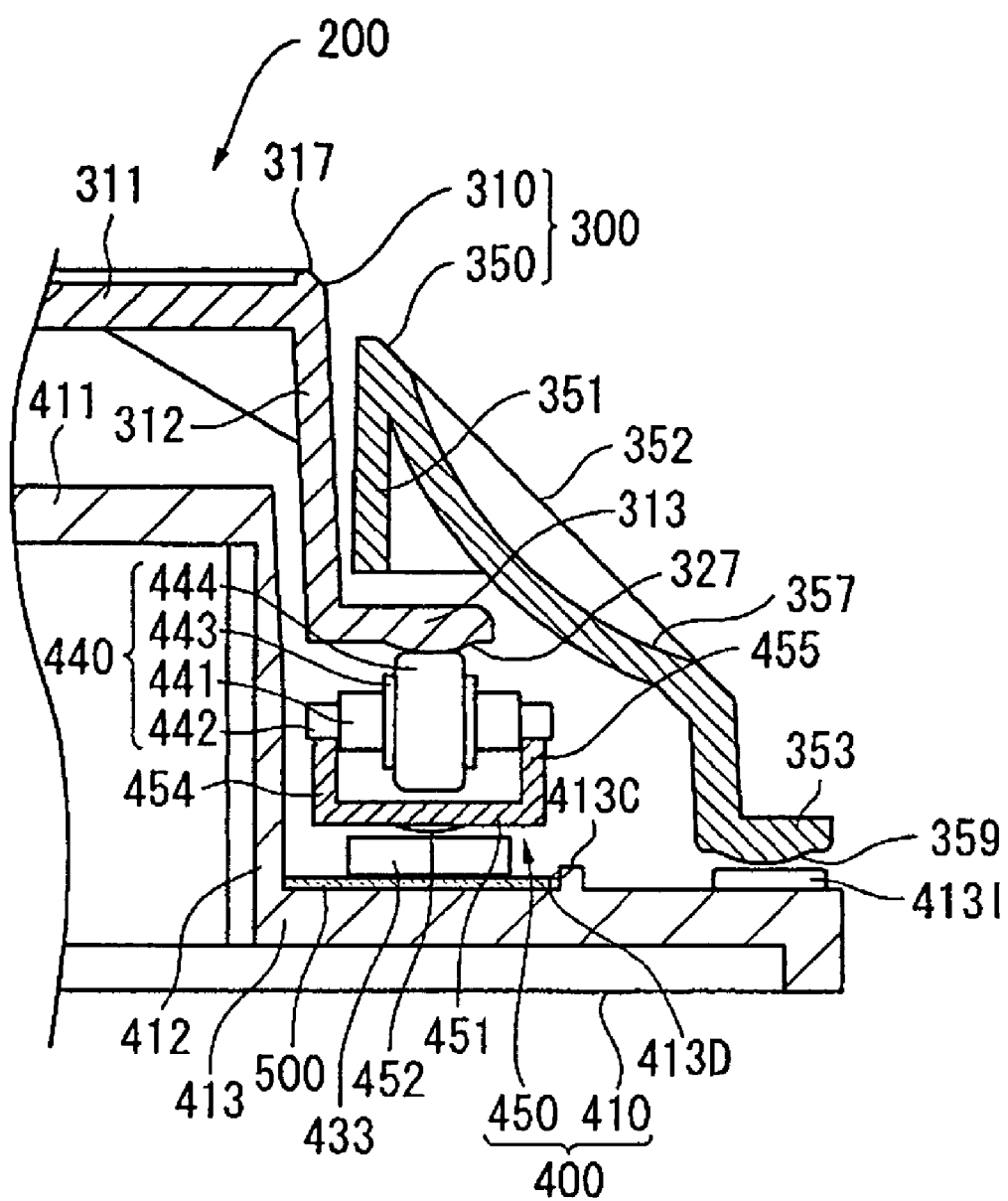
FIG. 14 is a fragmentary sectional view showing a first buffer incorporated in the switch device according to the first embodiment and depicting some components arranged near the first buffer.
Figure 15:
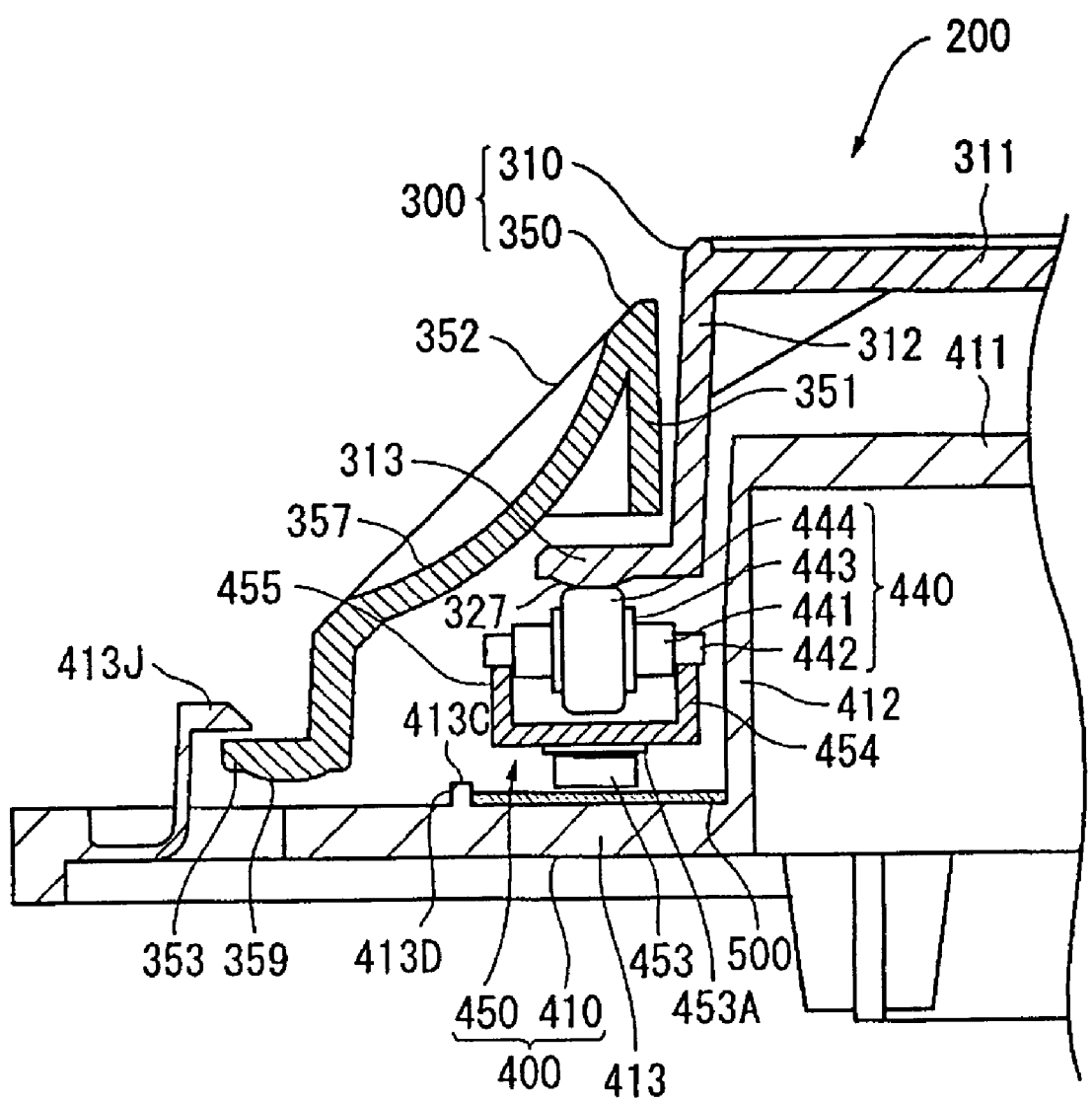
FIG. 15 is a fragmentary sectional view showing a second buffer incorporated in the switch device according to the first embodiment and depicting some components arranged near the second buffer.

The switch device 200 according to the present invention will be described with reference to the drawings. FIG. 2 is a plan view showing the switch device. FIG. 3 is a cross-sectional view of the switch device. FIG. 4 is a cross-sectional view of the switch device 200, cut away at the rotation-detecting section incorporated in the switch device 200. FIG. 5 is an exploded perspective view of a part of the switch device 200, showing a rotary section. FIG. 6 is a plan view of a jog table unit. FIG. 7 is a plan view of the switch device 200, with the rotary section removed; it illustrates the relation between the rotary section and a rotation-detecting section. FIG. 8 is a plan view of the switch device 200, with the rotary section removed; it shows the position of the circuit board incorporated in the switch device 200. FIG. 9 is a plan view of the switch device 200, with the rotary section and rotational drive section removed. FIG. 10 is a plan view showing a part of the switch device 200, with the rotor member removed; it illustrates the rotation-detecting section and some components arranged near the rotation-detecting section. FIG. 11 is a perspective view of a part of the switch device 200, with the rotor member removed and with a part of the base cut away. FIG. 12 is a fragmentary sectional view showing the screw-holding rib incorporated in the switch device 200; it also depicts some components arranged near the screw-holding rib. FIG. 13 is a fragmentary sectional view depicting the guide-pin section used in the switch device 200; it also shows some components arranged near the guide-pin section. FIG. 14 is a fragmentary sectional view showing the first buffer incorporated in the switch device 200; it also depicts some components arranged near the first buffer. FIG. 15 is a fragmentary sectional view showing the second buffer incorporated in the switch device 200; it depicts some components arranged near the second buffer.

As FIGS. 1 to 4 show, the switch device 200 is designed and shaped like, for example, the turntable of a record player that plays back a record. The switch device 200 variably sets or changes operating modes of the data-processing section. More precisely, various states in which to process data, such as music data, are changed. For example, the direction and speed in and at which the music data should be played back and the stopping and restarting of playback are variably set. The switch device 200 comprises a rotary section 300, a shaft-supporting base 400 and a tape-shaped switch 500. The switch 500 functions as a motion-detecting section.

As FIGS. 1 to 5 show, the rotary section 300 has a jog table unit 310 and a joggling unit 350. The jog table unit 310 is an operation unit. The joggling unit 350 is a circumferential cover that serves as a support section. The jog table unit 310 and joggling unit 350 are made of ABS resin that has a relatively high mechanical strength and therefore finds a wide use in household electric appliances.

The jog table unit 310 comprises a table plate 311, a body 312 and a flange 313, which are formed integral with one another in disc form. The table plate 311 is a top plate shaped like a disc. The body 312 is coupled at its upper edge to the circumferential edge of the table plate 311. The flange 313 outwardly protrudes from the lower edge of the body 312, in the radial direction of the body 312. The table plate 311 has, in its center part, a circular display window 314. A stepped holding ring 315 is provided on the table plate 311 and is concentric thereto. The ring 315 surrounds the display window 314. A transparent protection disc (not shown) is secured to the table plate 311. To be more specific, the protection disc has its circumferential edge fitted in the stepped holding ring 315.

Two holding ribs 317 are provided on the table plate 311 of the jog table unit 310. The ribs 317 are annular members, both concentric to the table plate 311. One holding rib 317 surrounds the stepped holding ring 315. The other holding rib 317 is mounted on the circumferential edge of the table plate 311. A ring-shaped friction disc 318 is mounted on that part of the table plate 311, which lies between the holding ribs 317. The friction disc 318 is, for example, a polycarbonate disc or a rubber disc, which is likely to cause friction.

A pair of guide ribs 321 protrude downward from the lower surface of the table plate 311, from which the body 312 projects. The guide ribs 321 are substantially concentric to the display window 314 and constitute a double-wall structure. The space between the guide ribs 321 serves as a guide groove 322. A first gear 323 is mounted on the outer guide rib 321.

Engagement sections are provided on the outer circumference of the body 312. The engagement sections are spaced apart at equal intervals along the circumference of the body 312. The engagement sections are, for example, one first engagement rib 325A and three second engagement ribs 325B. The first engagement rib 325A is different in shape from the second engagement ribs 325B. The width of the first engagement rib 325A is narrower than the second engagement ribs 325B in the circumferential direction of the body 312. Nonetheless, the first engagement rib 325A and the second engagement ribs 325B may be identical in shape.

A first annular member 327 is provided on the lower surface of the flange 313 of the jog table unit 310, which is opposed to the side surrounding the body 312. The first annular member 327 is concentric to the table plate 311. Its cross section bulges downward, taken along the diameter of the rotary section 300.

The joggling unit 350 is shaped like a ring, having a hollow cylinder 351, an operation surface 352 and an engagement flange 353. The hollow cylinder 351 has such an inner diameter as to allow passage of the body 312 of the jog table unit 310 but not to allow passage of the flange 313 thereof. The lower end of the hollow cylinder 351 has, for example, one first notch 353A and three second notches 353B. The notches 353A and 353B are spaced apart at equal intervals along the circumference of the hollow cylinder 351. The notches 353A and 353B are provided for receiving the first engagement rib 325A and three second engagement ribs 325B that are provided on the outer circumference of the body 312. The first engagement rib 325A and three second engagement ribs 325B of the jog table unit 310 can fit into, and come out of, these notches 353A and 353B when the jog table unit 310 is moved in the axial direction of the rotary section 300.

The operation surface 352 inclines downward from the upper edge of the hollow cylinder 351 and covers the hollow cylinder 351. Operation recesses 357 are provided on the circumferential surface of the operation surface 352 which are substantially spherical depressions and spaced at equal intervals. A plurality of projections, for example, three columnar projections 358, are provided on the circumferential surface of the operation surface 352, are located between the operation recesses 357 and extend slantwise and almost straight. A hollow cylinder is formed at the lower end of the operation surface 352. This hollow cylinder is substantially coaxial with the above-mentioned hollow cylinder 351.

The engagement flange 353 extends outward and horizontally from the lower end of the operation surface 352. A second annular member 359 is provided on the lower surface of the flange 353. Like the first annular member 327 of the jog table unit 310, the second annular member 359 has a cross section that bulges downward, taken along the diameter of the rotary section 300.

As FIGS. 2 to 4 and FIGS. 7 to 9 show, the shaft-supporting base 400 has a base part 410 and a rotational drive section 450. The rotational drive section 450 serves as a support section. The base part 410 supports the rotary section 300, allowing the same to rotate. The rotational drive section 450 guides and supports the rotary section 300 supported by the base part 410, enabling the section 300 to rotate smoothly.

The base part 410 is made of, for example, ABS resin that has a comparatively high mechanical strength and is therefore used in household electric appliances. The base part 410 is shaped like a disc, comprising a top plate 411, a hollow cylinder 412 and a flange 413 that are formed integral with one another. The top plate 411 is a disc. The hollow cylinder 412 is secured, at the upper end thereof, to the circumference of the top plate 411. The flange 413 extends from the lower end of the hollow cylinder 412, outwards in the radial direction of the hollow cylinder 412.

The top plate 411 of the base part 410 has a substantially square window 421 in the virtually center part. The top plate 411 has a rotation-detecting window 422, which is near the circumference of the top plate 411. A spring stop-claw 423 protrudes downward from that part of the top plate 411, in the vicinity of the rotation-detecting window 422. A pair of fastening ribs 424 are projected downward from the top plate 411. Each fastening rib 424 is shaped like a hollow cylinder and opens at its upper and lower ends. A pair of fastening pins 425 are provided on the predetermined position near the fastening ribs 424, respectively. Each fastening pin 425 has a semispherical upper end.

A rotation-detecting section 470 is provided on the top plate 411, facing the rotation-detecting window 422. The rotation-detecting section 470 has a base plate 471, a second gear 472, a rotation-detecting plate 473 and a rotation-detecting sensor 474.

The base plate 471 is a rectangular plate. A coil-holding hollow cylinder 471A is provided at one end of the base plate 471. This coil-holding hollow cylinder 471A protrudes downward from the base plate 471. The coil-holding hollow cylinder 471A loosely holds a shaft-supporting rib 426A, allowing the rib 426A to rotate. The shaft-supporting rib 426A is a hollow cylindrical member having the axial direction in thickness direction of the base plate 471 and protrudes downward from the top plate 411. The base plate 471 is coupled at said one end to the shaft-supporting rib 426A with a fastening member 475 such as a screw. The base plate 471 so can swing at the other end.

A spring-holding claw 471B is provided near the coil-holding hollow cylinder 471A. The claw 471B protrudes from the base plate 471 in the same direction the coil-holding hollow cylinder 471A projects. The base plate 471 is fastened to the lower surface of the top plate 411 with the fastening member 475 that is inserted in the coil-holding hollow cylinder 471A. Thus the other end of the base plate 471 can rotate toward and away from the circumference of the top plate 411. A torsion coil spring 476, for example, is pivotally secured to the coil-holding hollow cylinder 471A. The torsion coil spring 476 is fastened at one end to the spring stop-claw 423 of the top plate 411 and at the other end to the spring-holding claw 471B of the base plate 471. The torsion coil spring 476 acts on the base plate 471, biasing the other end (or distal end) of the base plate 471 toward the center of the top plate 411 at all times.

A shaft 471C projects from the middle part of the base plate 471 in the longitudinal direction, substantially in parallel to the coil-holding hollow cylinder 471A. The second gear 472 is rotatably mounted on the shaft 471C. The second gear 472 protrudes from the upper surface of the top plate 411 through the rotation-detecting window 422 of the top plate 411. The second gear 472 is in mesh with the first gear 323 of the jog table unit 310. A pair of positioning pins 472A protrude from one side of the second gear 472, spaced apart from each other in the diameter of the second gear 472. A rotation-detecting plate 473 is secured to the second gear 472 with adhesive or the like.

The base plate 471 has a rotation-controlling hole 471D in the vicinity of the coil-holding hollow cylinder 471A. A rotation-controlling rib 426B protrudes downward from the top plate 411 and extends through the rotation-controlling hole 471D. In normal condition, the bias of the torsion coil spring 476 holds the base plate 471 as such a position that the second gear 472 remains in mesh with the first gear 323 of the jog table unit 310. When the jog table unit 310 is quickly rotated and the first gear 323 is thereby fast rotated, the rotation-controlling rib 426B passing through the rotation-controlling hole 471D prevents the base plate 471 from rotating against the bias of the torsion coil spring 476, so that the second gear 472 would not come out of the engagement with the first gear 323. Hence, the rotation of the first gear 323 is reliably transmitted to the second gear 472.

The rotation-detecting plate 473 is a disc made of transparent synthetic resin. The plate 473 has a greater diameter than the gears. As seen from FIGS. 10 and 11, a ring-shaped scale 473A is printed on the plate 473. The scale 473A consists of lines that extend in radial direction of the rotation-detecting plate 473. The rotation-detecting plate 473 has a positioning hole (not shown), into which the positioning pins 472A protruding from the second gear 472 may be inserted. The plate 473 is integrally secured to the second gear 472, with the scale 473A located outside the circumference of the second gear 472.

The rotation-detecting sensor 474 is provided on the distal end of the base plate 471. The rotation-detecting sensor 474 has, for example, a photosensor 474A and a Circuit board 474B. A circuit is mounted on the circuit board 474B, to receive a signal from the photosensor 474A and generate a specific signal from the signal received. The photosensor 474A is secured to the circuit board 474B and comprises a light-emitting element and a light-receiving element. The light-emitting element and the light-receiving element are spaced apart, with the scale 473A interposed between them. The photosensor 474A has an optical axis that extends in the direction of thickness of the rotation-detecting plate 473. The circuit board 474B has a connector 474C to which a power-supply line may be connected.

The rotation-detecting sensor 474 may be a magnetic sensor. In this case, the scale 473A consists of lines printed in magnetic ink on the plate 473.

As FIGS. 3 and 4 and FIGS. 7 to 9 show, a rotation guide 480 is provided on the top plate 411 of the base part 410, at one corner of the window 421. The guide 480 facilitates smooth rotation of the jog table unit 310 of the rotary section 300. The guide 480 has a plate 481 that is made of metal resistant to corrosion, such as stainless steel. The plate 481 is L-shaped, consisting of two arms 481A that extends at approximately right angles from each other. The arms 481A have one hole (not shown) each. The arms 481A are fastened to the fastening ribs 424 projecting downward from the top plate 411, respectively, with fixing members 481C, such as rivets or screws inserted in the holes. The arms 481A have a recess 481B each. The recesses 481B may receive the fastening pins 425 protruding from the top plate 411. When the pins 425 fit into the recesses 481B, the rotation guide 480 is set at a prescribed position on the top plate 411.

The plate 481 is not limited to a stainless steel plate. It may be made of any other metal. Preferably, the plate 481 is a metal plate that is resistant to corrosion or treated to become resistant to corrosion. Further, the plate 481 is not limited to a metal plate; it can be made of synthetic resin having sufficient mechanical strength, such as engineering plastics.

Moreover, two guide pins 482 protrude from the arms 481A of the plate 481, respectively, each at the distal end of either arm 481A. Each guide pin 482 comprises a shaft 482A and a roller 482B. The shaft 482A integrally stands on the plate 481 and extends in the direction of thickness of the plate 481. The approximately spherical roller 482B made of brass etc. is rotatably mounted on the shaft 482A. The guide pins 482 are secured to the top plate 411. The guide pins 482 are so positioned to be the same distance from the center of the table plate 311, for example, to be positioned that the apex of an isosceles right triangle lies at the center of the top plate 411, the hypotenuse of the triangle being a line segment that connects the axes of the shafts 482A of the guide pins 482. The rotation guide 480 is set in the guide groove 322 of the jog table unit 310 to holds the jog table unit 310, allowing the same to rotate around an axis that passes the center of the base part 410.

The rotation guide 480 may not have the plate 481. If so, the guide pins 482 are directly secured to the top plate 411. The number of guide pins 482 is not limited to two. Three or more guide pins 482 may be used. The guide pins 482 may be replaced by circumferentially projecting ribs on which rollers are mounted. The guide pins 482 may have any configuration so long as they can support the rotary section 300, allowing the same to rotate.

A plurality of ribs 427 protrude downward from the top plate 411 of the base part 410. Screws 427A fasten a circuit board 428 to the ribs 427. Mounted on the circuit board 428 is a display 429 for displaying the modes in which the data-processing section is operating. The display 429 has a display panel that opposes the window 421 made in the top plate 411. A connector (not shown) is mounted on the circuit board 428. The connector connects a terminal 432 of a tape-shaped switch 430 (later described), one end of a line (not shown) connected to the rotation-detecting section 470 and the lines connected to various circuit boards (not shown) incorporated in the main case 110.

As FIG. 4 and FIGS. 7 to 9 depict, the hollow cylinder 412 of the base part 410 has a first escape groove 412A and a plurality of second escape grooves, for example, three grooves 412B. The grooves 412A and 412B extend parallel to the axis of the hollow cylinder 412, to the top plate 411. The first escape groove 412A is broader than the second escape grooves 412B. The cylinder 412 has a wiring window 412C.

The flange 413 of the base part 410 has a screw-holding rib 413A and a guide pin 413B. The screw-holding rib 413A and pin 413B protrude upward from the bottom of the first escape recess 412A. The flange 413 has another guide pin 413B. This guide pin 413B protrudes upward from the bottom of one second escape recess 412B that is located diametrically to the first escape groove 412A. The guide pins 413B therefore diametrically oppose to each other, with respect to the hollow cylinder 412.

The flange 413 has another screw-holding rib 413A, which protrudes upward from the bottom of another second escape recess 412B. Thus, three screw-holding ribs 413A are provided, spaced at equal intervals of 120° along the circumference of the hollow cylinder 412 of the base part 410. The ribs 413A have a height smaller than that of the guide pins 413B.

The flange 413 has still another rib, a wiring rib 413C that is a hollow cylinder surrounding the hollow cylinder 412. The annular space between the hollow cylinder 412 and the wiring rib 413C serves as wiring groove 413D. Wire-positioning ribs 413E are provided on the wiring rib 413C, in the vicinity of the wiring window 412C of the hollow cylinder 412. The wire-positioning ribs 413E extend across the wiring groove 413D.

As illustrated in FIGS. 3, 4 and 9, the tape-shaped switch 500 is arranged in the wiring groove 413D. As indicated above, the switch 500 functions as a motion-detecting section. It comprises a plurality of switches, for example six switches 501. The switches 501 are, for example, membrane switches and spaced apart at regular intervals. The switch 500 looks arcuate as viewed from above, having almost the same shape as the wiring groove 413D. The switch 500 has a terminal 502 at one end. The terminal 502 is connected to the switches 501. One end of the switch 500 extends through the wiring window 412C into the hollow cylinder 412. The other end of the switch 500 is held at a wire-positioning rib 413E. Pressure-sensitive switches or the like may replace the switches 501, which are contact switches. The switch 500 need not be shaped like a tape. It may have any other shape, provided that it can detect the depressing of the jog table unit 310.

First buffers 433 are attached to the tape-shaped switch 500, covering the switches 501, respectively. The first buffers 433 are approximately columned-shape used as cushion members or support sections. They are made of rubber foam or dense micro-cell urethane foam. Some other first buffers may be provided. A single buffer that is laid on the entire tape-shaped switch 500 may replace the first buffers 433. The material of the first buffers 433 is not limited to resin foam such as rubber foam. The first buffers 433 may be made of elastic material such as rubber. Alternatively, elastic members such as coil springs may replace the first buffers 433.

As FIG. 4, FIGS. 7 to 10 and FIGS. 12 and 13 show, the flange 413 has a plurality of roller houses 413F, for example, eight roller houses. The roller houses 413F are recesses made in that surface of the flange 413 from which the hollow cylinder 412 projects and opening upwardly. They are spaced apart from one another, at regular intervals along the circumference of the hollow cylinder 412. A roller escape 413G is made in the middle part of each roller house 413F. A pair of first bearings 413H protrude from the bottom of each roller house 413F, opposing each other and extending at substantially right angles to the axis of the hollow cylinder 412. Each first bearing 413H has a bearing recess 413H1 that is made-in its distal end. A first roller 440 is rotatably mounted on the bearings 413H in each roller house 413F.

Each first roller 440 comprises a shaft 441, a pair of pins 442, a wheel part 443, and a roller part 444. The shaft 441 is as long as the distance between the first bearings 413H. The shaft 441 is made of, for example, polyoxymethylene (POM). The pins 442 project from the ends of the shaft 441, each being coaxial with the shaft 441. The pins 442 are rotatably fitted in the bearing recess 413H1. The wheel 443 is mounted on the shaft 441 and formed integral with the middle part of the shaft 441. The roller part 444 is a hollow cylinder made of, for example, rubber and mounted on the wheel part 443. Each first roller 440 extends in radial direction of the hollow cylinder 412to be rotatably held in one roller escape 413G, with the outer circumferential surface of the roller part 444 not contacting the bottom of the roller house 413F and protruding a bit upward from the upper surface of the flange 413.

As seen from FIG. 3, FIGS. 7 to 10 and FIG. 14, a plurality of ribs 413I project upward from the top of the flange 413, spaced apart from one another along the circumference of the flange 413. Each rib 413I is located at a midpoint between two adjacent roller houses 413F. The ribs 413I extend at substantially right angles to the axis of the hollow cylinder 412. Thus, they extend in radial direction of the hollow cylinder 412. Each rib 413I has its top at a level lower than the plane defined by the circumferences of the first rollers 440.

The second annular member 359 of the joggling unit 350 abuts on the roller parts 444 of the first rollers 440. The rollers 440 support the joggling unit 350, allowing the unit 350 to rotate around the axis of the base part 410, together with the jog table unit 310. In normal condition, the second annular member 359 of the joggling unit 350 does not abut on the ribs 413I, but abut on the ribs 413I only when a large force acts on respective components from above. Hence, the ribs 413I prevent the components from being damaged.

As FIGS. 7 to 10 and FIG. 15 show, a plurality of guide claws, for example three claws 413J, protrude upward from the flange 413. The guide claws 413J are spaced at substantially regular intervals along the circumference of the hollow cylinder 412. Each guide claw 413J has a claw 413J1 that protrudes toward the outer circumferential surface of the hollow cylinder 412. The guide claws 413J hold the engagement flange 353 of the joggling unit 350, thus preventing the joggling unit 350 from slipping out of the base part 410. Note that the guide claws 413J can be elastically bend in the radial direction of the hollow cylinder 412. More precisely, they may bend away from the joggling unit 350, making it possible to move the joggling unit 350 to and from the prescribed position. When the engagement flange 353 moves to any position below the claws 413J, the guide claws 413J resume their initial positions and hold the joggling unit 350 in the prescribed position.

As seen from the FIGS. 7 to 10, the flange 413 of the base part 410 has a plurality of screw holes 413K. The screw holes 413K are used to fasten the base part 410 to the main case 110.

As FIGS. 3, 4, 7, 8, 10 and FIGS. 12 to 15 depict, the rotational drive section 450 supports the jog table unit 310 of the rotary section 300, allowing the same to rotate. As the jog table unit 310 is depressed, the rotational drive section 450 moves down to turn on the switches 501 of the tape-shaped switch 500. The rotational drive section 450 is shaped like a ring and is made of, for example, POM. The rotational drive section 450 has a ring-shaped actuating member 451. The actuating member 451 can be mounted on the hollow cylinder 412 of the base part 410. It has a diameter comparable to that of the wiring groove 413D of the base part 410. A plurality of pushing members 452 are arranged on the lower surface of the base part 410, which opposes the wiring groove 413D. The members 452 are provided in greater numbers than the switches 501 of the tape-shaped switch 500. They are semispherical, each protruding downward from the base part 410. Some of the pushing members 452 are aligned with the switches 501 of the tape-shaped switch 500, respectively. The members 452 may be provided in exactly the same numbers as the switches 501 and may not be placed in alignment with the switches 501.

A plurality of second buffers, for example three buffers 453, are secured to the lower surface of the actuating member 451 with fastening members 453A such as adhesive layers. The second buffers 453 are approximately columned-shape used as support sections or biasing sections. They are made of rubber foam or dense micro-cell urethane foam. The second buffers 453 are mounted on the three of the pushing members 452. These three pushing members 452 are aligned with the three of the switches 501, which are spaced at equal intervals of 120° along the circumference of the tape-shaped switch 500. The second buffers 453 may be provided in the same number as all switches 501 or all pushing members 452. If this is the case, the second buffers 453 are mounted on all pushing members 452. The second buffers 453 may be replaced by a single buffer laid on the entire lower surface of the actuating member 451. The material of the second buffers 453 is not limited to resin foam such as rubber foam or dense micro-cell urethane foam. The first buffers 433 may be made of elastic material such as rubber. Alternatively, the first buffers 433 may be replaced by elastic members such as coil springs.

Two hollow cylindrical flanges 454 and 455 protrude upwardly from the inner and outer circumferential edges of the actuating member 451. A plurality of reinforcing ribs 456 are provided at the upper edge of the actuating member 451. These ribs 456 extend in radial direction of the actuating member 451 in the space between the inner flange 454 and the outer flange 455, thus bridging or connecting the flanges 454 and 455.

The rotational drive section 450 has a plurality of tongue-shaped support strips 457. The support strips 457 extend horizontally from the upper edge of the inner flange 454 toward the axis of the inner flange 454. The support strips 457 are provided for the screw-holding ribs 413A and the guide pins 413B of the base part 410, respectively. Each strip 457 has a rib hole 457A and a guide-pin hole 457B respectively preventing the screw-holding rib 413A and the guide pin 413B. The holes 457A and 457B have diameter larger than those of the screw-holding ribs 413A and guide pins 413B.

The rotational drive section 450 is positioned to move up and down and rotate. This is because the screw-holding ribs 413A and guide pins 413B pass through the rib holes 457A and guide-pin holes 457B of the support strips 457. Screws 458 are driven into the screw-holding ribs 413A. The screws 458 cannot be inserted into the rib holes 457A. Hence, the rotational drive section 450 can be positioned, having no risk of slipping off from the screw-holding ribs 413A or the guide pins 413B, once the screws 458 are driven into the screw-holding ribs 413A.

As FIGS. 3 and 12 show, springs such as coil springs 460, which are used as biasing sections, are mounted on the screw-holding ribs 413A, respectively. Each coil spring 460 is interposed between the flange 413 and one support strip 457. The coil springs 460 bias the rotational drive section 450 upward, holding the rotational drive section 450 in contact with the screws 458 driven into the screw-holding ribs 413A. Nonetheless, the rotational drive section 450 that is arranged on the base part 410 can be moved downward against the bias of the coil springs 460. The rotational drive section 450 would not move downward in its entirety. Rather, it only tilts downward when a force is applied to only one part to move this part down since the coil spring 460 is biasing.

Even if any part of the rotational drive section 450 moves downward to contact one of the tape-shaped switch 500, the joggling unit 350 remains in engagement with the jog table unit 310. In other words, the first engagement rib 325A and second engagement ribs 325B of the jog table unit 310 do not come out from the first notch 353A and second notches 353B of the joggling unit 350.

As illustrated in FIG. 7, FIG. 8 and FIG. 10, a plurality of second bearings, for example, nine bearings 461 are provided at the upper edge of the inner flange 454. Similarly, nine second bearings 461 are provided at the upper edge of the outer flange 455. All bearings 461 are located at regular intervals along the circumference of the actuating member 451 and extend in the radial direction thereof. Each bearing 461 provided at the inner flange 454 is aligned with, and makes a pair with, one bearing 461 provided at the outer flange 454. The second bearings 461 are spaced apart at almost the same intervals as the first beatings 413H are spaced apart.

Second rollers 440 of the same shape as the first rollers 440 are rotatably mounted on the second bearings 461. The second bearings 461 are arranged between the reinforcing ribs 456. Therefore, the reinforcing ribs 456 would not interfere with the second rollers 440. Of the nine second rollers 440, the three rollers that spaced apart at regular intervals of 120° are aligned with sensors 431 (not shown) of the tape-shaped switch 430, arranged near the screw-holding ribs 413A and aligned with the first buffers 433 not provided with the second buffers 453.

The first annular member 327 of the jog table unit 310 abuts on the outer circumferential surfaces of the roller parts 444 of the second rollers 440 of the rotational drive section 450 attached to the base part 410. Thus, the rollers 440 support the joggling unit 350, allowing the unit 350 to rotate around the axis of the base part 410, together with the jog table unit 310.

The rotary section 300 is rotatably supported on the base part 410. Note that the rotary section 300 comprises the jog table unit 310 and joggling unit 350 that are assembled together by engaging the first engagement ribs 325A with the first notch 353A and second engagement ribs 325B with the second notch 353B. It should be also noted that the base part 410 constitutes the shaft-supporting base 400. The rotary section 300, shaft-supporting base 400 and the tape-shaped switch 500 constitute the switch device 200. The switch device 200 is held in place within the main case 110, connected to various circuit boards provided in the main case 110, secured to the case 110 with screws passing through the screw holes 431K. The switch device 200 comprises the rotary section 300, the shaft-supporting base 400 and the tape-shaped switch 500. The main case 110 conceals the hollow-cylindrical lower edge of the operation surface 352 of the joggling unit 350 and all components located below the engagement flange 353. The rotary section 300 is exposed through the window 130 made in the main case 110.

[Operation of the Switch Device]

How the switch device described above operates will be explained. Note that the playback apparatus 100 is designed to read data from optical disks and processes the data, thereby to play back the data. More specifically, the apparatus 100 reads music data from a recording medium and processes the music data, thus playing back the music.

First, the power switch to the playback apparatus 100 is turned on and the recording medium such as an optical disk is inserted into the apparatus 100 through the slot 120. When the medium is inserted into the apparatus 100, the automatic loading mechanism provided in the apparatus 100 places the recording medium at a prescribed position in the main case 110. The apparatus 100 reads the music data recorded in the medium. The data-processing section of the apparatus processes the music data into data that can be output to a playback section such as a speaker. The output data is supplied to the playback section, which reproduces music. While the music is being reproduced, the display 150 or the display 429 displays the modes.

The user may depress the jog table unit 310 of the rotary section 300 that is incorporated in the switch device 200. Then, the force depresses the jog table unit 310 makes the first engagement ribs 325A and second engagement ribs 325B of the jog table unit 310 move down the first notch 353A and second notches 353B that open to the joggling unit 350 mounted on the base part 410.

As the jog table unit 310 moves downward, the flange 313 of the jog table unit 310 moves down the second rollers 440 that support the flange 313 of the jog table unit 310 and allows the flange 313 to rotate. The rotational drive section 450, which supports the second rollers 440, is pushed down against the bias of the coil springs 460. The actuating member 451 of the rotational drive section 450 approaches the tape-shaped switch 500 that faces the lower surface of the actuating member 451.

One of the pushing members 452 provided on the lower surface of the actuating member 451 abuts on one first buffer 433 provided on the tape-shaped switch 500. This first buffer 433 is thereby elastically deformed. One of the second buffers 453 provided on the lower surface of the actuating member 451 abut on the tape-shaped switch 500, elastically deforming one second buffer 453. As the first buffer 433 restores its shape, it closes one switch 501 of the tape-shaped switch 500, which is aligned with the first buffer 433.

When the switch 501 of the tape-shaped switch 500 is closed, the data-processor determines the closing. Then, in the data-processor, the process control section controls the process that data-processing section is performing on the music data read from the recording medium. More precisely, reproducing the music data is stopped. The coil spring 460, first buffer 433 and second buffer 453, which have been elastically deformed at the time of depressing the jog table unit 310, apply a reaction to the user as they restore their shapes. This reaction is set to be almost the same as the reaction that the user receives when manually controls the rotation of the turntable of a record player.

Thus, the data-processing section stops reproducing the music data when the user depresses the jog table unit 310. Instead, the data-reading section may start reading a prescribed part of the music data from the medium and the data-processing section may start reproducing this part of the music data, when the user depresses the jog table unit 310.

The user may rotate the jog table unit 310 forward and backward by a certain angle while depressing the jog table unit 310. In this case, the joggling unit 350 is rotated forward and backward, too. The jog table unit 310 can be rotated since the guide pins 482 of the rotation guide 480 provided on the base part 410 are fitted in the guide groove 322 of the jog table unit 310. The joggling unit 350 can be rotated, too. This is because the joggling unit 350 is mounted on and supported by the first rollers 440 provided on the base part 410, holds the jog table unit 310 and can rotate around the axis of the jog table unit 310. Even while the jog table unit 310 is being depressed, moving downward, the first engagement ribs 325A and second engagement ribs 325B remain engaged with the first notch 353A and second notches 353B of the joggling unit 350. The joggling unit 350 therefore rotates whenever the jog table unit 310 is rotated.

When the jog table unit 310 is rotated, the second gear 472 of the rotation-detecting section 470 rotates because it is in mesh with the first gear 323 of the jog table unit 310. As the second gear 472 rotates, the rotation-detecting plate 473 formed integral with the second gear 472 rotates. The scale 473A printed on the plate 473 moves across the optical axis of the photosensor 474A of the rotation-detecting sensor 474.

When the scale 473A moves across the optical axis of the photosensor 474A, it blocks the light beam emitted from the light-emitting element of the photosensor 474A. The rotation-detecting sensor 474 generates a signal, which is supplied to the data-processor. From the signal the data-processing section determines the direction and speed in and at which the jog table unit 310 is being rotated. In the data-processor; the process control section controls the data-processing section in accordance with the direction and speed thus determined to process the music data in forward direction or reverse direction. Thus, the music can be repeatedly played back in the forward and reverse directions as the user repeatedly rotates the jog table unit 310 forward and backward.

When the user stops depressing the jog table unit 310, any coil spring 460 that has been elastically deformed and the first buffer 433 and second buffer 453, both associated with this coil spring 460, restore their shapes, pushing the rotational drive section 450 upwardly. The rotational drive section 450 moves away from the tape-shaped switch 500. The switch 501 of the tape-shaped switch 500 is therefore opened. The data-processor determines the opening. In the data-processor, the process control section causes the data-processing section to process the music data again. As a result, the music is played back again.

When the user rotates the joggling unit 350, the jog table unit 310 is rotated, too. This is because the jog table unit 310 is coupled with the joggling unit 350 as indicated above. As both the jog table unit 310 and the joggling unit 350 are rotated, the rotation-detecting sensor 474 of the rotation-detecting section 470 generates a signal. The signal is supplied to the data-processing section. From the signal the data-processor determines that the switches 501 of the tape-shaped switch 500 are opened. It also determines the direction and speed in and at which the jog table unit 310 is rotated. Hence, the process control section of the data-processor causes the data-processing section to play back the music at a speed higher or lower than the normal playback speed, in accordance with the direction in which the user is rotating the jog table unit 310.

[Advantages of Embodiment]

In the embodiment described above, the switch device 200 comprises the shaft-supporting base 400, the second rollers 440, the jog table unit 310, and the rotation-detecting section 470. As indicated above, the second rollers 440 are provided on the shaft-supporting base 400, lie in the same plane and extend in the radial direction of the jog table unit 310. The jog table unit 310 is rotatably supported by the shaft-supporting base 400, with its circumferential edge supported on the second rollers 440. The rotation-detecting section 470 is mounted on the shaft-supporting base 400 and detects the rotation of the jog table unit 310.

Thus, the jog table unit 310 is rotatably supported by the rollers at a position that is outside the position where the user operates for the rotation. This ensures smooth rotation of the jog table unit 310. A friction develops at the rollers while the rollers are rotating. This friction gives the user a good feeling of rotating the jog table unit 310. More precisely, the user can feel as controlling the rotation of the turntable of a record player. Namely, the rollers are so supported to give this feeling to the user. Feeling as depressing the turntable of a record player, the user can operate the playback apparatus 100 with the switch device 200 to perform high DJ playing techniques, thus accomplishing attractive DJ playing.

Since the roller parts 444 of the second rollers 440 are made of elastic material such as rubber, the jog table unit 310 can be rotated smoothly. When the user rotates the jog table unit 310, the user can therefore feel as rotating the turntable of a record player.

In the embodiment, the switch device 200 comprises the base part 410, jog table unit 310, support section and tape-shaped switch 500. The jog table unit 310 can be depressed. The jog table unit 310 has a flange 313 located at the circumferential edge. At least one part of the flange 313 can be moved to and from the base part 410 when the jog table unit 310 is depressed. The support section supports the flange 313, biasing at least one part of the flange 313 away from the base part 410. The tape-shaped switch 500 is provided in association with the base part 410 or the flange 313, or both. The switch 500 detects that the flange 313 is moving toward the base part 410 as the user depresses the jog table unit 310.

Hence, the detecting structure that detects the depressing of the jog table unit 310 is located outside that part of the unit 310, which is depressed. The detecting structure is therefore more simple than otherwise. Since the detecting structure is located outside said part of the unit 310, the member for detecting the depressing moves downward more than at the position where the depression is performed to ensure reliable detection of the depressing. At the position that the detecting structure assumes, the support sections control the motion of the jog table unit 310 toward the base part 410, thus biasing the unit 310 away from the base part 410. As a result, the jog table unit 310 is depressed while being biased at its circumferential part to give the user a real feeling of depressing the unit 310. To be more specific, the user can feel as depressing the turntable of a record player. Since the user can feel so, the user can operate the playback apparatus 100 provided with the switch device 200 to perform good DJ playing. In other words, the switch device 200 enables the user to accomplish attractive DJ playing.

Moreover, the jog table unit 310 has a flange 313 that protrudes outward from the table plate 311 via the hollow cylinder 312. Thus, the rotational drive section 450 can support the flange 313 outside the position where the jog table unit 310 is depressed. Besides, the detecting structure that detects the motion of the unit 310 toward the base part 410, outside the region where the unit 310 is depressed, can be simple than otherwise.

In the jog table unit 310, the table plate 311 is shaped like a disc and the flange 313 is concentric to the table plate 311 and has a larger diameter than the table plate 311. Thus, the jog table unit 310 can be supported not only to be depressed but also to be rotated.

The rotational drive section 450 that is conformed in shape to the flange 313 of the jog table unit 310 can move the jog table unit 310 toward the base part 410. Further, the biasing section biases the jog table unit 310 away from the base part 410. The jog table unit 310 can therefore be more smoothly moved or rotated in the direction intersecting with the direction it is depressed, than in the case where it is supported directly on the base part 410. This renders the switch device 200 more versatile and useful than otherwise.

The biasing section that biases the rotational drive section 450 away from the base part 410 comprises springs such as the coil springs 460. The structure is therefore simple. In addition, the bias that makes the user feel as depressing the turntable of a record player can be easily adjusted, merely by selecting the material of the springs or changing the number of springs.

As indicated above, the three coil springs 460 arranged at regular intervals in the circumferential direction support the rotational drive section 450. Thus, the jog table unit 310 of the rotational drive section 300 can be easily supported and rotated. This enables the user to feel as manipulating the turntable of a record player.

The springs constituting the biasing section is positioned at the flange 313 of the jog table unit 310. So positioned, the springs bias the tape-shaped switch 500 that detects the depressing of the jog table unit 310, outside the region where the jog table unit 310 is depressed. Thus, the springs help to make the user feel as if depressing the turntable of a record player.

As described above, the first buffers 433 and second buffers 453 undergo elastic deformation when the user depresses the jog table unit 310 and moves it down toward the base part 410. The buffers 433 and 453 exert a reaction to the user's fingers as they restore their shapes. This reaction cooperates with the bias of the springs, e.g., coil springs 460. That is, the structure constituted by the buffers 433 and 453, though simple, can serve to give the user the same feeling he or she has when he or she depresses the turntable of a record player.

Springs, such as the three coil springs 460, are arranged at equal intervals of about 120°. Six first buffers 433 are arranged at regular intervals of 60° in the circumferential direction, aligned with the switch 501 of the tape-shaped switch 500. Further, the second buffers 453 lie between the springs. Though the springs are provided in small numbers, the springs can give the user the same feeling as depressing any part of the jog table unit 310 that is larger than ordinary switches. In other words, a relatively simple structure can make the user feel as depressing the turntable of a record player as well as the depression can be detected.

Semi-spherical pushing members are provided on the lower surface of the rotational drive section 450 that supports the jog table unit 310, allowing the same to move to and from the base part 410. The lower surface of the rotational drive section 450 opposes the switches 501 of the tape-shaped switch 500. Therefore, the depressing of the jog table unit 310 can be detected, without increasing the dimension of the switch device 200 in the direction the jog table unit 310 is depressed to close the switch 501 of the tape-shaped switch 500. Thus, a simple structure can reliably close the switches 501 when the user depresses the jog table unit 310.

The rotational drive section 450 that supports the jog table unit 310 has the second rollers 440 that extend in the radial direction of the jog table unit 310. The rollers 440 support the jog table unit 310 in a plane perpendicular to the direction in which the jog table unit 310 can be depressed. The rotation-detecting section 470 can therefore detect the rotation of the jog table unit 310, too. Namely, the switch device 200 can control the processing of data in accordance with two motions, though it is simple in structure.

To detect the rotation of the jog table unit 310, the first gear 323 and the second gear 472 are provided on the jog table unit 310 and the rotation-detecting section 470, respectively. The second gear 472 is in mesh with the first gear 323 and can move in the axial direction. Thus, a simple structure can move the rotation-detecting section 470 for detecting the rotation of the unit 310, relative to the unit 310 in the same direction as the jog table unit 310 is depressed. The jog table unit 310 can therefore be smoothly moved in two different directions; it can be smoothly depressed and rotated.

The first gear 323 is mounted on the guide rib 321. Being a double-wall structure, the guide rib 321 defines a guide groove 322. The guide groove 322 holds the jog table unit 310, allowing the same to rotate. No other members are required to support the first gear 323. The guide rib 321 serves not only to support the jog table unit 310, but also to detect the rotation of the unit 310. This helps to facilitate the manufacture of the switch device 200 and to render the switch device 200 small and lightweight.

Further, a simple structure can easily support the jog table unit 310, allowing the same to rotate, since the guide groove 322, which receives the guide pins 482 protruding from the base part 410 has a double-wall structure.

The first annular member 327 is provided on the lower surface of the flange 313 of the jog table unit 310, which is supported by the rotational drive section 450. The first annular member 327 is mounted on the second rollers 440 to rotate around its axis. The annular member 327 has a cross section that bulges downward to contacts each second roller 440 in a very small area, almost at a point. Namely, a simple structure enables the jog table unit 310 to rotate smoothly.

The joggling unit 350 is a hollow cylinder that is fitted, covering the circumferential surface of the jog table unit 310. The joggling unit 350 lies on the base part 410 and can rotate. The unit 350 therefore allows the jog table unit 310 to rotate only, without being depressed. The unit 350 conceals the components that support the jog table unit 310 and the structure that detects the depressing of the unit 310. It can therefore improve the outer appearance of the switch device 200. The joggling unit 350 achieves various advantages alone.

As described above, the joggling unit 350 has the first notch 353A and the second notches 353B. The first notch 353A can receive first engagement rib 325A of the jog table unit 310. The second notches 353B can receive the second engagement ribs 325B of the jog table unit 310. The rotation of the jog table unit 310 is therefore transmitted to the joggling unit 350. So is the rotation of the joggling unit 350 to the jog table unit 310. Hence, the units 310 and 350 rotate together. Moreover, only the jog table unit 310 can be moved when the user depresses it, by means of a simple structure. Further, the jog table unit 310 and the joggling unit 350 are combined, constituting the rotational drive section 300. This facilitates the manufacture of the switch device 200.

The first engagement rib 325A and second engagement ribs 325B are provided on the outer circumference of the hollow cylinder 312. Since the ribs 325A and 325 are shaped like notches and open downward, they provide a structure that is simple can yet allow only the jog table unit 310 to rotate when it is rotated. This simple structure serves to simplify the switch device 200, facilitate the manufacture of the device 200 and render the device 200 small and lightweight.

As indicated before, the first rollers 440 are provided on the base part 410 that support the joggling unit 350, allowing the same to rotate. Thus, the rotational drive section 300 can rotate more smoothly than otherwise.

The second annular member 359 is provided on the lower surface of the flange 353 of the joggling unit 350, which is supported by the base part 410. The second annular member 359 has a cross section that bulges downward. Therefore, the joggling unit 350 contacts each first roller 440, almost at a point, as the jog table unit 310 does. Thus, a simple structure can ensure smooth rotation of the joggling unit 350.

The rotation guide 480 has two guide pins 482 that protrude from the plate 481. The guide pins 482 position the jog table unit 310 and allow the same to rotate around an axis that passes the center of the base part 410. Thus, a simple structure can hold the jog table unit 310 at a prescribed position, allowing the same to rotate around the axis of the base part 410. This facilitates the manufacture of the switch device 200.

Further, the guide pins 482 are so positioned that the apex of an isosceles right triangle lies at the center of the top plate 411, the hypotenuse of the triangle being a line segment that connects the axes of the shafts 482A of the guide pins 482. The display 429 for displaying the operating modes of the data-processing section can be arranged at the center of the switch device 200. With the playback apparatus 100, the user can clearly recognize the various modes in which the data-processing section is processing data.

The two guide pins 413B spaced apart in the radial direction of the hollow cylinder 412 hold the rotational drive section 450 at a predetermined position. The rotary member 450 can therefore be moved up and down and its rotation can yet be more reliably controlled than in the case where it is positioned by the screw-holding rib 413A only.

[Modification of the Embodiment]

The present invention has been described according to the preferred embodiment. However the scope of the present invention is not restricted to the above specific embodiment, but includes modifications and improvements as long as an object of the present invention can be attained.

As specified above, the switch device 200 is described to operate as if it were the turntable of a record player that plays back a recorded disc. Namely, the device 200 has a jog table unit 310 that is shaped like a turntable. Nevertheless, the jog table unit 310 need not be a disk-shaped one. Rather, it may be shaped like a prism. It may be one that looks like a star as viewed from above. Alternatively, it may appear like any character or any other figure, as viewed from above.

The playback apparatus 100 described above is configured to process music data. Instead, it may be designed to process not only music data, but also any other data such as image data and character data.

Furthermore, a specific program may be installed into a computer, which can then function as a data-processing section or a process control section. The switch device 200 may be connected to the computer to cause the computer to process the data the device has acquired, to provide a game apparatus, or to operate as a controller for a game apparatus.

As described above, the jog table unit 310 can be depressed and rotated. Instead, the jog table unit 310 may be designed to be depressed only. If this is the case, the joggling unit 350 can be dispensed with.

Further, the rotational drive section 450 need not be used to support the jog table unit 310. If so, the base part 410 may support the jog table unit 310 with assistance of a biasing section or the like.

The rotational drive section 450 may comprise a pair of support members and a rotatable member interposed between the support members. The support members opposing each other and can rotate relative to each other. In other words, the members supporting the jog table unit 310 and allowing the same to rotate are not limited to the second rollers 440. Instead, only the guide pins 482 may support the jog table unit 310.

The rotation-detecting section 470 is not limited to one that has the photosensor 474A. It may have a magnetic sensor, instead. It may comprise rollers, instead of the first gear 323 and second gear 472. The scale 473A, which consists of lines, may be printed on the jog table unit 310, not on the plate 473. Needless to say, the rotation-detecting section 470 can be dispensed with, if the jog table unit 310 is not configured to rotate.

The rotational drive section 450 may not have the second rollers 440 for supporting the jog table unit 310. If this the case, the jog table unit 310 can only be depressed; it cannot be rotated at all.

The biasing structure is not limited to one that comprises springs such as coil springs 460, the first buffers 433 and the second buffers 453. Rather, the biasing structure may comprise only coil springs, first buffers or second buffers, coil springs and first buffers, first buffers and second buffers, or second buffers and coil springs, to bias the jog table unit 310 away from the base part 410.

The coil springs 460, first buffers 433 and the second buffers 453 may be arranged at any positions, provided that the user can have a feeling of operating the switch device 200.

As described above, the rotational drive section 450 has the pushing members 452 that bulge downward. The pushing members 452 may have a different shape or may not be provided at all.

The first annular member 327 and second annular member 359 may assume any shape other than those specified above or may not be provided at all.

The jog table unit 310 is positioned by means of two guide pins 413B. The guide pins 413B may be provided in different numbers, may have any shape other than specified above, or may not be provided at all. More specifically, only one guide pin may be used; the guide pins may be prisms, not round bars; the jog table unit 310 may be positioned with the screw-holding rib 413A only; and the rotational drive section 450 may not be positioned in its circumferential direction.

The component that detects the motion of the jog table unit 310 is not limited to the tape-shaped switch 500. Any other membrane switch can be used to detect the motion of the jog table unit 310. Further, a contact switch or a pressure-sensitive switch may replace the switch 500. Alternatively, a photosensor, a magnetic sensor or an acoustic sensor, which measures the distance between it and the jog table unit 310 to determine the motion of the unit 310, may replace the switch 500. Being a thin-sheet switch, the tape-shaped switch 500 helps to render the switch device 200 small and lightweight.

As indicated above, the guide pins 482 stand on the base part 410 and the jog table unit 310 has guide groove 322. Instead, the base part 410 may have the guide groove 322 and the guide pins 482 may protrude from the jog table unit 310. Further, any other possible configuration may be employed to support the jog table unit 310, allowing the same to rotate.

The structure of the embodiment and the operation sequence of the embodiment can be changed or modified, so long as the object of the invention is attained.

What is claimed is:

1. An operating device for controlling a signal, comprising:
   a rotatable operation unit;
   a detecting section that detects the rotation of the operation unit;
   a base section that rotatably supports the operation unit;
   a shaft provided on the base section, the shaft being arranged in a direction aligned with the radial direction of the operation unit; and
   a plurality of rollers rotatably supported by the shaft, the rollers being in contact with a (bottom) side of the operation unit to support the operation unit.

2. The operating device according to claim 1, wherein each of the rollers has an elastic roller part, which contacts the circumferential edge of the operation unit.

3. The operating device according to claim 1, wherein the rollers are disposed on the base section via an elastically deformable elastic member, the operation unit moving up and down in a direction orthogonal to a rotary plane of the operation unit.

4. The operating device according to claim 3, wherein the base section has a plurality of guide pins which protrude toward the top plate of the operation unit, the top plate has a guide groove which is made in a surface opposing the base section and which extends in the circumferential direction of the operation unit, and the guide pins are slidably inserted in the guide groove to slide within the guide groove.

5. The operating device according to claim 4, wherein said plurality of guide pins are positioned at substantially the same distance from the center of the top plate of the operation section unit.

6. The operating device according to claim 4, wherein each of the guide pins comprises a shaft and a guide roller, which is rotatably mounted on the shaft.

7. The operating device according to claim 3, wherein the top plate has a pair of annular guide ribs which are concentric to the top plate, have different diameters and define the guide groove.

8. The operating device according to claim 7, wherein the operation unit has a first gear provided on a circumferential surface of one of the pair of guide ribs and the detecting section is arranged on the base section and comprises a second gear and a rotation-detecting sensor for detecting the rotation of the second gear, the first gear and the second gear being set in mesh with the second gear.

9. The operating device according to claim 3, wherein the operation unit has a first gear on a surface which opposes the base section, the detecting section arranged on the base section which comprising the second gear set in mesh with the first gear and the rotation-detecting sensor for detecting the rotation of the second gear.

10. The operating device according to claim 3, wherein the elastic member is a spring.

11. The operating device according to claim 1, wherein the base section has a plurality of guide pins which protrude toward the operation unit, the operation unit has a guide groove which is made in a surface opposing the base section, and the guide pins are slidably inserted in the guide groove to slide within the guide groove.

12. The operating device according to claim 1, wherein the base section comprising a base part which supports the operation unit, allowing the operation unit to rotate, and a rotational drive section which is provided on the base part to move in a direction intersecting with the direction the operation unit rotates and which supports the rollers supporting the operation unit, allowing the rollers to rotate; and a motion-detecting section is provided to detect the motion of the rotational drive section.

13. The operating device according to claim 1, wherein the base section comprises a base part which supports the operation unit, allowing the operation unit to rotate, and a rotational drive section which is provided on the base part to move in a direction intersecting with the direction the operation unit rotates and which supports the rollers supporting the operation unit, allowing the rollers to rotate; a motion-detecting section is provided to detect the motion of the rotational drive section; the operation unit has the first gear on a surface which opposes the base section; and the detecting section comprises the second gear arranged on the base part set in mesh with the first gear to move in the direction the rotational drive section is moved, and the rotation-detecting sensor for detecting the rotation of the second gear.

14. The operating device according to claim 12, further comprising an annular cover rotatably supported by the base section and holding the operation unit at the inner circumference, allowing the same to move in axial direction.

15. The operating device according to claim 14, wherein the operation unit has a fastening member, the annular cover has, at the inner circumference, an engagement member which positions the fastening member of the operation unit in a circumferential direction and which is able to move in an axial direction to engage with and disengage from the fastening member of the operation unit.

16. The operating device according to claim 14, wherein the base section comprises a plurality of rollers which support the annular cover, allowing the annular cover to rotate.

17. The operating device according to claim 1, wherein a resistance which the operation unit receives when rotated with respect to the base section is set to be substantially equal to a load which a turntable of a record player receives when rotated.

* * * * *